US010872556B2

(12) United States Patent
Sim

(10) Patent No.: US 10,872,556 B2
(45) Date of Patent: Dec. 22, 2020

(54) DISPLAY METHOD AND APPARATUS FOR ELECTRONIC DEVICE

(71) Applicant: SAMSUNG ELECTRONICS CO., LTD., Suwon-si (KR)

(72) Inventor: Hyun-Woo Sim, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 59 days.

(21) Appl. No.: 15/749,255

(22) PCT Filed: Jul. 14, 2016

(86) PCT No.: PCT/KR2016/007637
§ 371 (c)(1),
(2) Date: Jan. 31, 2018

(87) PCT Pub. No.: WO2017/022971
PCT Pub. Date: Feb. 9, 2017

(65) Prior Publication Data
US 2018/0226012 A1 Aug. 9, 2018

(30) Foreign Application Priority Data

Jul. 31, 2015 (KR) ........................ 10-2015-0109088

(51) Int. Cl.
G09G 3/20 (2006.01)
G09G 5/36 (2006.01)
(Continued)

(52) U.S. Cl.
CPC ......... *G09G 3/2096* (2013.01); *G06F 1/1601* (2013.01); *G06F 3/04886* (2013.01);
(Continued)

(58) Field of Classification Search
CPC ........ G09G 3/20; G09G 5/363; G09G 3/2096; G06F 3/04886
See application file for complete search history.

(56) References Cited

U.S. PATENT DOCUMENTS

2006/0109343 A1* 5/2006 Watanabe ............ G02B 21/365
348/79
2007/0019111 A1* 1/2007 Won .......................... H04N 5/45
348/569

(Continued)

FOREIGN PATENT DOCUMENTS

CN 1985291 6/2007
CN 101751114 6/2010
(Continued)

OTHER PUBLICATIONS

Communication pursuant to Article 94(3) EPC dated Jan. 2, 2018 in counterpart European Patent Application No. EP16833208.8.
(Continued)

*Primary Examiner* — Abbas I Abdulselam
(74) *Attorney, Agent, or Firm* — Nixon & Vanderhye, P.C.

(57) ABSTRACT

Various embodiments of the present invention relate to a display processing method and apparatus for an electronic device having a display divided into a first area and a second area. According to various embodiments of the present invention, the electronic device comprises: a housing; the display including the first area, which is exposed to one surface of the housing and is flat, and the second area, which extends from the first area and of which at least a portion is curved; a second processor operatively connected to the display; a first processor operatively connected to the second processor; and at least one memory operatively connected to the first processor and/or the second processor, wherein the at least one memory can be configured to store: first instruc-
(Continued)

tions, to be executed, for allowing the first processor to process data to be displayed on the first area of the display so as to provide the processed data to the second processor; and second instructions, to be executed, for allowing the second processor to process the data provided from the first processor so as to generate data to be displayed on the second area of the display. Various embodiments are possible.

15 Claims, 16 Drawing Sheets

(51) Int. Cl.
G06F 1/16 (2006.01)
G06F 3/0488 (2013.01)
G06F 3/14 (2006.01)

(52) U.S. Cl.
CPC .............. *G09G 3/20* (2013.01); *G09G 5/363* (2013.01); *G06F 3/1438* (2013.01); *G09G 2310/0232* (2013.01); *G09G 2330/022* (2013.01); *G09G 2380/02* (2013.01)

(56) References Cited

U.S. PATENT DOCUMENTS

| | | | |
|---|---|---|---|
| 2009/0033675 A1 | 2/2009 | Hunt et al. | |
| 2010/0137035 A1* | 6/2010 | Shan | G06F 1/3293 455/566 |
| 2010/0227650 A1 | 9/2010 | Kim et al. | |
| 2013/0040732 A1 | 2/2013 | Crowder | |
| 2013/0176237 A1 | 7/2013 | Chu | |
| 2014/0063068 A1* | 3/2014 | Jotshi | G06F 3/1446 345/660 |
| 2014/0267091 A1 | 9/2014 | Kim | |
| 2015/0015511 A1 | 1/2015 | Kwak et al. | |
| 2015/0154734 A1 | 6/2015 | Kim et al. | |
| 2015/0198978 A1* | 7/2015 | Catchpole | G06F 1/1632 345/173 |
| 2016/0109970 A1* | 4/2016 | Aurongzeb | G06F 1/1643 345/173 |
| 2016/0335986 A1 | 11/2016 | Bae et al. | |
| 2017/0010689 A1* | 1/2017 | Bostick | G06T 3/40 |

FOREIGN PATENT DOCUMENTS

| | | |
|---|---|---|
| CN | 102694925 | 9/2012 |
| CN | 103092327 | 5/2013 |
| CN | 103207768 | 7/2013 |
| JP | 2007-219205 | 8/2007 |
| KR | 10-2010-0099419 | 9/2010 |
| KR | 10-2013-0082471 | 7/2013 |
| KR | 10-2013-0100082 | 9/2013 |
| KR | 10-2014-0112756 | 9/2014 |
| KR | 10-2015-0063824 | 6/2015 |
| KR | 10-2015-0084561 | 7/2015 |
| WO | 2014/142382 | 9/2014 |
| WO | 2015/108339 | 7/2015 |

OTHER PUBLICATIONS

International Search Report for PCT/KR2016/007637, dated Nov. 10, 2016, 4 pages.
Written Opinion of the ISA for PCT/KR2016/007637, dated Nov. 10, 2016, 7 pages.
Extended Search Report dated Jun. 8, 2018 in counterpart European Patent Application No. EP16833208.8.
Communication pursuant to Article 94(3) EPC dated Oct. 18, 2019 in counterpart European Patent Application No. EP16833208.8.
First Office Action dated Sep. 3, 2020 in counterpart CN Application No. 201680044681.9 and English-language translation.

\* cited by examiner

DISPLAY METHOD AND APPARATUS FOR ELECTRONIC DEVICE

This application is the U.S. national phase of International Application No. PCT/KR2016/007637 filed 14 Jul. 2016, which designated the U.S. and claims priority to KR Patent Application No. 10-2015-0109088 filed 31 Jul. 2015, the entire contents of each of which are hereby incorporated by reference.

TECHNICAL FIELD

Various embodiments of the present disclosure relate to a display processing method and apparatus in an electronic device.

BACKGROUND AND SUMMARY

With the recent development of digital technologies, various types of electronic devices such as a mobile communication terminal, a smart phone, a tablet Personal Computer (PC), a Personal Digital Assistant (PDA), an electronic note, a notebook, a wearable device, and a Television (TV) are widely used. Further, recently, a flexible display and an electronic device having a bent display, which is implemented by a combination of a flexible display and an electronic device, have been developed and used. The flexible display represents a display that may be bent and unbent freely, and a bent display may represent a display which is maintained to be bent in consideration of design and the like.

An electronic device having a bent display may extend a display area to the left and right side of the electronic device as well as the front of the electronic device. For example, when a bent display is applied to an electronic device, the left and right edge part of the display may be bent to make a screen look larger. According to an embodiment, a display panel may be provided in various variations, such as 16:10, 16:11, etc. instead of the standard resolution (e.g., 16:9).

An electronic device functions for specific processing (e.g., image processing for display, such as image drawing) for a display area of the electronic device in a processor (e.g., an Application Processor (AP)). For example, the electronic device may operate in a structure in which the processor (e.g., an AP) generates an image through image processing on all display areas of the display, and then draws the corresponding image on the display. Further, the electronic device may operate by dividing the display area into a main area and a sub-area. In the electronic device operating by dividing the display area into the main area and the sub-area, the processor may process an image through image processing for the sub-area. Therefore, the processor may consume current corresponding to image processing for all display areas, even during image processing for the sub-area, and as a result, the entire current consumption of the processor may increase. For example, when an AP performs image processing for all display areas, a current of approximately 200 mW to 300 mW is consumed.

Various embodiments provide a display method and device that may reduce current consumption according to an operation of a bent display in the electronic device.

Various embodiments provide the display method and device that may divide the bent display into a main area of the front surface and a sub-area of the side surface, and may independently process the main area and the sub-area, in the electronic device having the bent display.

Various embodiments provide the display method and device, in which display may be performed by processing, by the processor (e.g., AP), only an image for display of the main area of the bent display and processing, by a display control circuit (e.g., a Display Driver IC (DDI)), an image for display of the remaining area (e.g., a sub-area) of the bent display.

An electronic device according to various embodiments of the present disclosure may include: a housing; a display including a first area, which is exposed to one surface of the housing and is flat, and a second area, which extends from the first area and at least a part of which is bent; a second processor electrically connected with the display; a first processor electrically connected with the second processor; and at least one memory electrically connected with at least one of the first processor and the second processor, wherein the at least one memory is configured to store: first instructions that cause, when executed, the first processor to process data to be displayed in the first area of the display and provide the processed data to the second processor; and second instructions that cause, when executed, the second processor to process the data provided from the first processor and generate data to be displayed in the second area of the display.

An electronic device of the various embodiments of the present disclosure may include: a housing; a display including a first area, which is exposed to one surface of the housing and is flat, and a second area, which extends from the first area and at least a part of which is bent; at least two processors electrically connected with the display; and at least one memory electrically connected with at least one of the at least two processors, wherein the at least one memory is configured to store first instructions that cause, when executed, a first processor among the at least two processors to display a screen in the first area and the second area, and the at least one memory is configured to store second instructions that cause, when executed, a second processor among the at least two processors to display a screen in the second area without displaying the screen in the first area.

The electronic device according to various embodiments of the present disclosure may include: the display that includes the main area of the front surface and the sub-area of the side surface, and displays an image received from a display control circuit on the basis of at least a part of the main area and sun-area; the processor that processes a full resolution image corresponding to the main area and the sub-area or a light resolution image corresponding to the main area, and transfers the processed image to the display control circuit; and the display control circuit that transfers the full resolution image transferred from the processor to the display, or processes a virtual image for the sub-area and transfers the virtual image and the light resolution image transferred from the processor to the display.

An operation method according to various embodiments of the present disclosure may include: a first process procedure that processes a light resolution image for a main area of a display, corresponding to a display scheme; a second process procedure that processes a virtual image for a sub-area of the display on the basis of the light resolution image; and a third process procedure that processes the display by using the light resolution image and the virtual image.

In order to solve the technical problem, various embodiments of the present disclosure may include a computer-readable recording medium having a program recorded therein to perform a method by a processor.

A display method and device according to various embodiments of the present disclosure may decrease current consumption according to a display operation. In various embodiments, in a specific scenario (e.g., a lock screen, Internet, a gallery, and the like), a processor (e.g., an AP) processes an image for display of a main area and a display control circuit (e.g., a Display Driver IC (DDI)) processes an image for display of the remaining area (e.g., a sub-area), so that current consumption can be decreased.

According to various embodiments, when a display area is divided into a main area and a sub-area, the degree of freedom of user interface (UI) implementation can be increased by which a display control circuit processes, instead of a processor, an image for the sub-area (e.g., an edge part of a bent display, a folded surface of a flexible display, a sub-area distinguished in a flat display, or the like). For example, in an electronic device to which a dual-edge is applied, a right and left edge part (e.g., a sub-area) may be displayed in accordance with a corresponding user interface without being influenced by current consumption, while a standard resolution (a main area resolution, e.g. 16:9) is being displayed, so that a screen is enlarged (e.g., 16:10 and 16:11). Further, a bezel area of the electronic device can be minimized.

DETAILED DESCRIPTION OF EXAMPLE EMBODIMENTS

Figure 1:
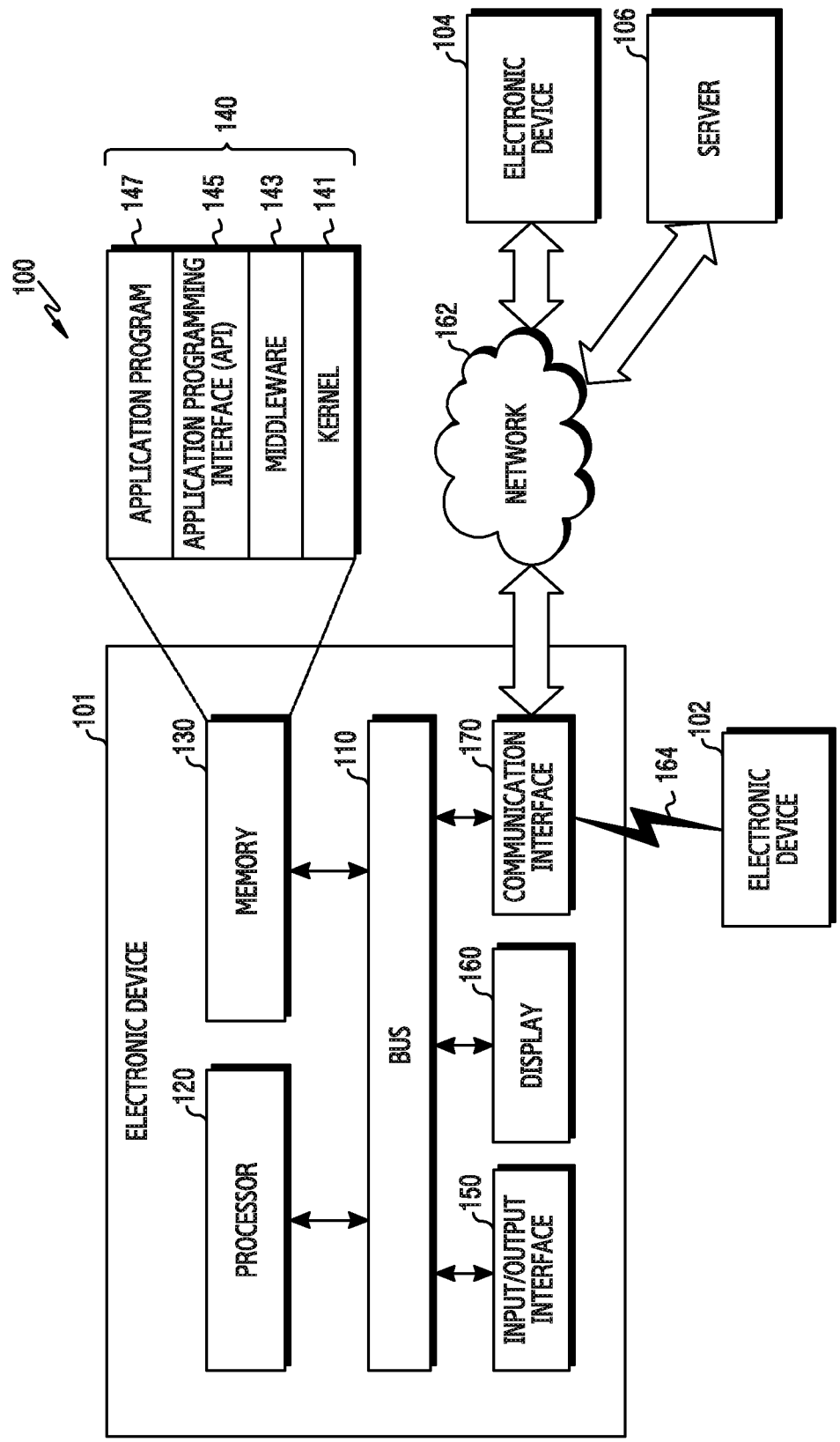
FIG. 1 illustrates a diagram for a network environment including an electronic device according to various embodiments of the present disclosure.

Hereinafter, various example embodiments of the present disclosure will be described with reference to the accompanying drawings. However, it should be understood that there is no intent to limit the present disclosure to the particular forms disclosed herein; rather, the present disclosure should be understood to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposed between them. In contrast, it may be understood that when an element (e.g., first element) is referred to as being "directly connected," or "directly coupled" to another element (second element), there are no element (e.g., third element) interposed between them.

The expression "configured to" used in the present disclosure may be used interchangeably with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may refer to a situation in which that the device, together with other devices or components, "is able to". For example, the phrase "processor adapted (or configured) to perform A, B, and C" may refer, for example, to a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used in the present disclosure are only used to describe specific embodiments, and are not intended to limit the present disclosure. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even where the term is defined in the present disclosure, it should not be interpreted to exclude embodiments of the present disclosure.

An electronic device according to various example embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device, or the like, but is not limited thereto. According to various example embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit), or the like, but is not limited thereto.

According to some example embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame, or the like, but is not limited thereto.

According to another example embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.), or the like, but is not limited thereto.

According to some example embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter), or the like, but is not limited thereto. The electronic device according to various example embodiments of the present disclosure may be a combination of one or more of the aforementioned various devices. The electronic device according to some embodiments of the present disclosure may be a flexible device. Further, the electronic device according to an example embodiment of the present disclosure is not limited to the aforementioned devices, and may include a new electronic device according to the development of technology.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1 is a diagram illustrating an example network environment including an electronic device according to various example embodiments of the present disclosure.

An electronic device 101 within a network environment 100, according to various embodiments, will be described with reference to FIG. 1. The electronic device 101 may include a bus 110, a processor (e.g., including processing circuitry) 120, a memory 130, an input/output interface (e.g., including input/output circuitry) 150, a display 160, and a communication interface (e.g., including communication circuitry) 170. According to an example embodiment of the present disclosure, the electronic device 101 may omit at least one of the above components or may further include other components.

The bus 110 may include, for example, a circuit which interconnects the components 110 to 170 and delivers a communication (e.g., a control message and/or data) between the components 110 to 170.

The processor 120 may include various processing circuitry, such as, for example, and without limitation, one or more of a dedicated processor, a Central Processing Unit (CPU), an Application Processor (AP), and a Communication Processor (CP). The processor 120 may carry out, for example, calculation or data processing relating to control and/or communication of at least one other component of the electronic device 101. An operation of processing (or controlling) the processor 120 according to various example embodiments will be described below in detail with reference to the accompanying drawings.

The memory 130 may include a volatile memory and/or a non-volatile memory. The memory 130 may store, for example, commands or data relevant to at least one other component of the electronic device 101. According to an embodiment of the present disclosure, the memory 130 may store software and/or a program 140. The program 140 may include, for example, a kernel 141, middleware 143, an Application Programming Interface (API) 145, and/or application programs (or "applications") 147. At least some of the kernel 141, the middleware 143, and the API 145 may be referred to as an Operating System (OS). The memory 130 may include a computer readable recording medium having a program recorded thereon to execute the method according to various example embodiments in the processor 120.

The kernel 141 may control or manage system resources (e.g., the bus 110, the processor 120, or the memory 130) used for performing an operation or function implemented in the other programs (e.g., the middleware 143, the API 145, or the application programs 147). Furthermore, the kernel 141 may provide an interface through which the middleware 143, the API 145, or the application programs 147 may access the individual components of the electronic device 101 to control or manage the system resources.

The middleware 143, for example, may serve as an intermediary for allowing the API 145 or the application programs 147 to communicate with the kernel 141 to exchange data.

Also, the middleware 143 may process one or more task requests received from the application programs 147 according to priorities thereof. For example, the middleware 143 may assign priorities for using the system resources (e.g., the bus 110, the processor 120, the memory 130, or the like) of the electronic device 101, to at least one of the application programs 147. For example, the middleware 143 may perform scheduling or loading balancing on the one or more task requests by processing the one or more task requests according to the priorities assigned thereto.

The API 145 is an interface through which the applications 147 control functions provided from the kernel 141 or the middleware 143, and may include, for example, at least one interface or function (e.g., instruction) for file control, window control, image processing, character control, and the like.

The input/output interface 150, for example, may include various input/output circuitry and function as an interface that may transfer commands or data input from a user or another external device to the other element(s) of the electronic device 101. Furthermore, the input/output interface 150 may output the commands or data received from the other element(s) of the electronic device 101 to the user or another external device.

Examples of the display 160 may include a Liquid Crystal Display (LCD), a Light-Emitting Diode (LED) display, an Organic Light-Emitting Diode (OLED) display, a MicroElectroMechanical Systems (MEMS) display, and an electronic paper display, or the like, but is not limited thereto. The display 160 may display, for example, various types of contents (e.g., text, images, videos, icons, or symbols) to users. The display 160 may include a touch screen, and may receive, for example, a touch, gesture, proximity, or hovering input using an electronic pen or a user's body part.

The communication interface 170 may include various communication circuitry and may establish communication, for example, between the electronic device 101 and an external device (e.g., a first external electronic device 102, a second external electronic device 104, or a server 106). For example, the communication interface 170 may be connected to a network 162 through wireless or wired communication, and may communicate with an external device (e.g., the second external electronic device 104 or the server 106).

The wireless communication may use at least one of, for example, Long Term Evolution (LTE), LTE-Advance (LTE-A), Code Division Multiple Access (CDMA), Wideband CDMA (WCDMA), Universal Mobile Telecommunications System (UMTS), Wireless Broadband (WiBro), and Global System for Mobile Communications (GSM), as a cellular communication protocol. In addition, the wireless communication may include, for example, short range communication 164. The short-range communication 164 may include at least one of, for example, Wi-Fi, Bluetooth, Near Field Communication (NFC), and Global Navigation Satellite System (GNSS). GNSS may include, for example, at least one of global positioning system (GPS), global navigation satellite system (Glonass), Beidou Navigation satellite system (Beidou) or Galileo, and the European global satellite-based navigation system, based on a location, a bandwidth, or the like. Hereinafter, in the present disclosure, the "GPS" may be interchangeably used with the "GNSS". The wired communication may include, for example, at least one of a Universal Serial Bus (USB), a High Definition Multimedia Interface (HDMI), Recommended Standard 232 (RS-232), and a Plain Old Telephone Service (POTS).

The network 162 may include at least one of a telecommunication network such as a computer network (e.g., a LAN or a WAN), the Internet, and a telephone network.

Each of the first and second external electronic devices 102 and 104 may be of a type identical to or different from that of the electronic device 101. According to an embodiment of the present disclosure, the server 106 may include a group of one or more servers. According to various example embodiments of the present disclosure, all or some of the operations performed in the electronic device 101 may be executed in another electronic device or a plurality of electronic devices (e.g., the electronic devices 102 and 104 or the server 106). According to an embodiment of the present disclosure, when the electronic device 101 has to perform some functions or services automatically or in response to a request, the electronic device 101 may request another device (e.g., the electronic device 102 or 104 or the server 106) to execute at least some functions relating thereto instead of or in addition to autonomously performing the functions or services. Another electronic device (e.g., the electronic device 102 or 104, or the server 106) may execute the requested functions or the additional functions, and may deliver a result of the execution to the electronic device 101. The electronic device 101 may process the received result as it is or additionally, and may provide the requested functions or services. To this end, for example, cloud computing, distributed computing, or client-server computing technologies may be used.

Figure 2:
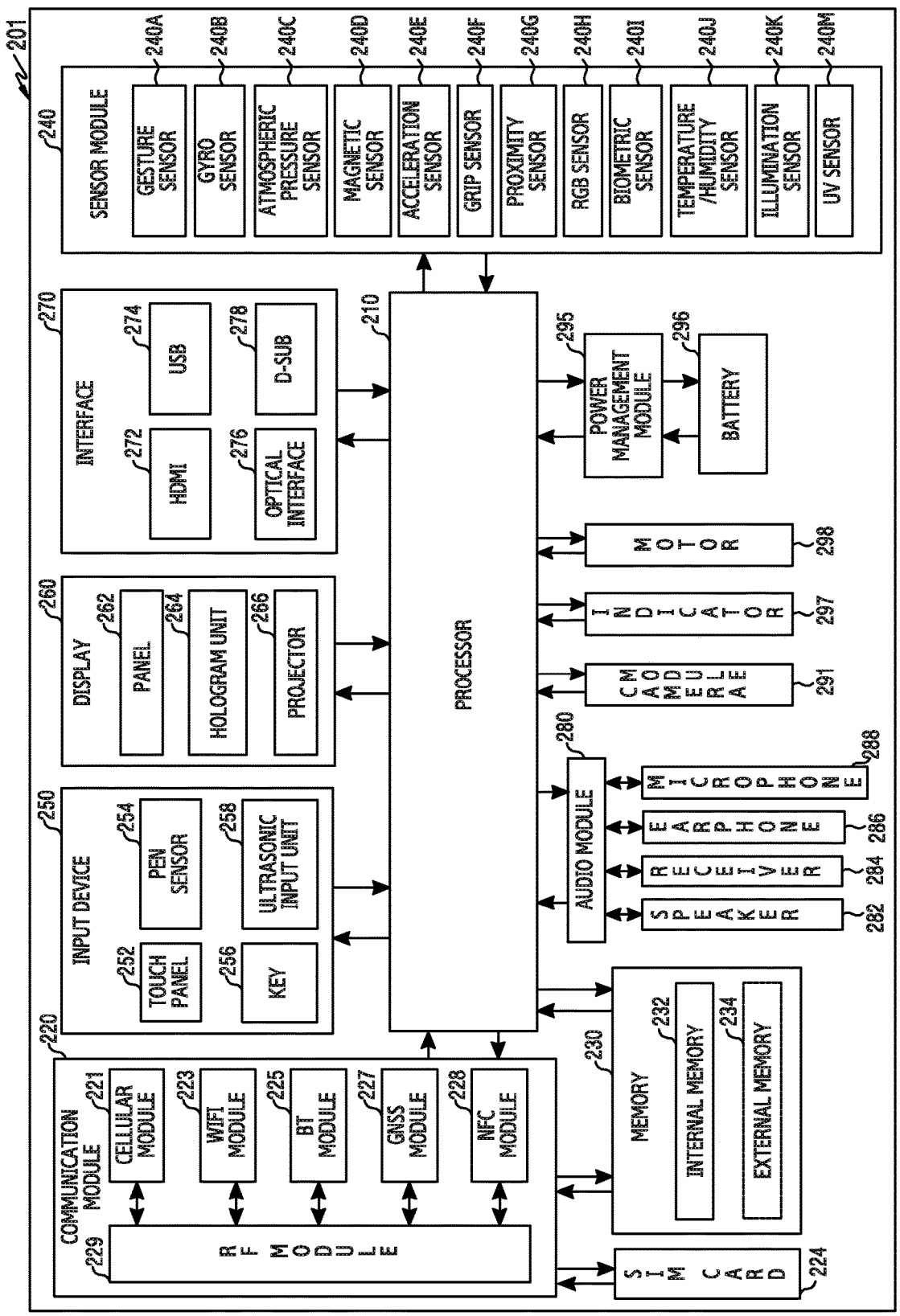
FIG. 2 illustrates a block diagram of an electronic device according to various embodiments of the present disclosure.

FIG. 2 is a block diagram illustrating an example electronic device according to various example embodiments of the present disclosure.

The electronic device 201 may include, for example, all or a part of the electronic device 101 illustrated in FIG. 1. The electronic device 201 may include one or more processors (e.g., including processing circuitry) 210 (e.g., Application Processors (AP)), a communication module (e.g., including communication circuitry) 220, a Subscriber Identification Module (SIM) 224, a memory 230, a sensor module 240, an input device (e.g., including input circuitry) 250, a display 260, an interface (e.g., including interface circuitry) 270, an audio module 280, a camera module (e.g., including a camera) 291, a power management module 295, a battery 296, an indicator 297, and a motor 298.

The processor 210 may include various processing circuitry configured to control a plurality of hardware or software components connected to the processor 210 by driving an operating system or an application program, and perform processing of various pieces of data and calculations. The processor 210 may be embodied as, for example, a System on Chip (SoC). According to an embodiment of the present disclosure, the processor 210 may further include a Graphic Processing Unit (GPU) and/or an image signal processor. The processor 210 may include at least some (for example, a cellular module 221) of the components illustrated in FIG. 2. The processor 210 may load, into a volatile memory, commands or data received from at least one (e.g., a non-volatile memory) of the other components and may process the loaded commands or data, and may store various data in a non-volatile memory.

The communication module 220 may have a configuration equal or similar to that of the communication interface 170 of FIG. 1. The communication module 220 may include various communication circuitry, such as, for example, and without limitation, a cellular module 221, a Wi-Fi module 223, a BT module 225, a GNSS module 227 (e.g., a GPS module 227, a Glonass module, a Beidou module, or a Galileo module), an NFC module 228, and a Radio Frequency (RF) module 229.

The cellular module 221, for example, may provide a voice call, a video call, a text message service, or an Internet service through a communication network. According to an embodiment of the present disclosure, the cellular module 221 may distinguish and authenticate the electronic device 201 in a communication network using the subscriber identification module 224 (for example, the SIM card). According to an embodiment of the present disclosure, the cellular module 221 may perform at least some of the functions that the AP 210 may provide. According to an embodiment of the present disclosure, the cellular module 221 may include a communication processor (CP).

For example, each of the Wi-Fi module 223, the BT module 225, the GNSS module 227, and the NFC module 228 may include a processor for processing data transmitted/received through a corresponding module. According to an embodiment of the present disclosure, at least some (e.g., two or more) of the cellular module 221, the Wi-Fi module 223, the BT module 225, the GNSS module 227, and the NFC module 228 may be included in one Integrated Chip (IC) or IC package.

The RF module 229, for example, may transmit/receive a communication signal (e.g., an RF signal). The RF module 229 may include, for example, a transceiver, a Power Amplifier Module (PAM), a frequency filter, a Low Noise Amplifier (LNA), and an antenna. According to another embodiment of the present disclosure, at least one of the cellular module 221, the WIFI module 223, the BT module 225, the GNSS module 227, and the NFC module 228 may transmit/receive an RF signal through a separate RF module.

The subscriber identification module 224 may include, for example, a card including a subscriber identity module and/or an embedded SIM, and may contain unique identification information (e.g., an Integrated Circuit Card Identifier (ICCID)) or subscriber information (e.g., an International Mobile Subscriber Identity (IMSI)).

The memory 230 (e.g., the memory 130) may include, for example, an embedded memory 232 and/or an external memory 234. The embedded memory 232 may include at least one of a volatile memory (e.g., a Dynamic Random Access Memory (DRAM), a Static RAM (SRAM), a Synchronous Dynamic RAM (SDRAM), and the like) and a non-volatile memory (e.g., a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (e.g., a NAND flash memory or a NOR flash memory), a hard disc drive, a Solid State Drive (SSD), and the like).

The external memory 234 may further include a flash drive, for example, a Compact Flash (CF), a Secure Digital (SD), a Micro Secure Digital (Micro-SD), a Mini Secure Digital (Mini-SD), an eXtreme Digital (xD), a MultiMediaCard (MMC), a memory stick, or the like. The external memory 234 may be functionally and/or physically connected to the electronic device 201 through various interfaces.

The sensor module 240, for example, may measure a physical quantity or detect an operation state of the electronic device 201, and may convert the measured or detected information into an electrical signal. The sensor module 240 may include, for example, at least one of a gesture sensor 240A, a gyro sensor 240B, an atmospheric pressure sensor (barometer) 240C, a magnetic sensor 240D, an acceleration sensor 240E, a grip sensor 240F, a proximity sensor 240G, a color sensor 240H (e.g., red, green, and blue (RGB) sensor), a biometric sensor (medical sensor) 240I, a temperature/humidity sensor 240J, an illuminance (e.g., light) sensor 240K, and a Ultra Violet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris scan sensor, and/or a finger scan sensor. The sensor module 240 may further include a control circuit for controlling one or more sensors included therein. According to an embodiment of the present disclosure, the electronic device 201 may further include a processor configured to control the sensor module 240, as a part of the processor 210 or separately from the processor 210, and may control the sensor module 240 while the processor 210 is in a sleep state.

The input device 250 may include various input circuitry, such as, for example, and without limitation, a touch panel 252, a (digital) pen sensor 254, a key 256, or an ultrasonic input device 258. The touch panel 252 may use, for example, at least one of a capacitive type, a resistive type, an infrared type, and an ultrasonic type. The touch panel 252 may further include a control circuit. The touch panel 252 may further include a tactile layer, and provide a tactile reaction to the user.

The (digital) pen sensor 254 may include, for example, a recognition sheet which is a part of the touch panel or is separated from the touch panel. The key 256 may include, for example, a physical button, an optical key or a keypad. The ultrasonic input device 258 may detect, through a microphone (e.g., the microphone 288), ultrasonic waves generated by an input tool, and identify data corresponding to the detected ultrasonic waves.

The display 260 (e.g., the display 160) may include a panel 262, a hologram device 264, or a projector 266.

The panel 262 may include a configuration identical or similar to the display 160 illustrated in FIG. 1. The panel 262 may be implemented to be, for example, flexible, transparent, or wearable. The panel 262 may be embodied as a single module with the touch panel 252. The hologram device 264 may show a three dimensional (3D) image in the air by using an interference of light. The projector 266 may project light onto a screen to display an image. The screen may be located, for example, in the interior of or on the exterior of the electronic device 201. According to an embodiment of the present disclosure, the display 260 may further include a control circuit for controlling the panel 262, the hologram device 264, or the projector 266.

The interface 270 may include various interface circuitry, such as, for example, and without limitation, a High-Definition Multimedia Interface (HDMI) 272, a Universal Serial Bus (USB) 274, an optical interface 276, or a D-subminiature (D-sub) 278. The interface 270 may be included in, for example, the communication interface 170 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

The audio module 280, for example, may bilaterally convert a sound and an electrical signal. At least some components of the audio module 280 may be included in, for example, the input/output interface 150 illustrated in FIG. 1. The audio module 280 may process voice information input or output through, for example, a speaker 282, a receiver 284, earphones 286, or the microphone 288.

The camera module 291 may include various circuitry including, for example, and without limitation, a camera, a device which may photograph a still image and a video, or the like. According to an embodiment of the present disclosure, the camera module 291 may include one or more image sensors (e.g., a front sensor or a back sensor), a lens, an Image Signal Processor (ISP) or a flash (e.g., LED or xenon lamp).

The power management module 295 may manage, for example, power of the electronic device 201. According to an embodiment of the present disclosure, the power management module 295 may include a Power Management Integrated Circuit (PMIC), a charger Integrated Circuit (IC), or a battery or fuel gauge. The PMIC may use a wired and/or wireless charging method. Examples of the wireless charging method may include, for example, a magnetic resonance method, a magnetic induction method, an electromagnetic wave method, and the like. Additional circuits (e.g., a coil loop, a resonance circuit, a rectifier, etc.) for wireless charging may be further included. The battery gauge may measure, for example, a residual quantity of the battery 296, and a voltage, a current, or a temperature while charging. The battery 296 may include, for example, a rechargeable battery and/or a solar battery.

The indicator 297 may display a particular state (e.g., a booting state, a message state, a charging state, or the like) of the electronic device 201 or a part (e.g., the processor 210) of the electronic device 201. The motor 298 may convert an electrical signal into a mechanical vibration, and may generate a vibration, a haptic effect, or the like. Although not illustrated, the electronic device 201 may include a processing device (e.g., a GPU) for supporting a mobile TV. The processing device for supporting a mobile TV may process, for example, media data according to a certain standard such as Digital Multimedia Broadcasting (DMB), Digital Video Broadcasting (DVB), or media-FLO™.

Each of the above-described component elements of hardware according to the present disclosure may be configured with one or more components, and the names of the corresponding component elements may vary based on the type of electronic device. In various embodiments, the electronic device may include at least one of the above-described elements. Some of the above-described elements may be omitted from the electronic device, or the electronic device may further include additional elements. Also, some of the hardware components according to various embodiments may be combined into one entity, which may perform functions identical to those of the relevant components before the combination.

Figure 3:
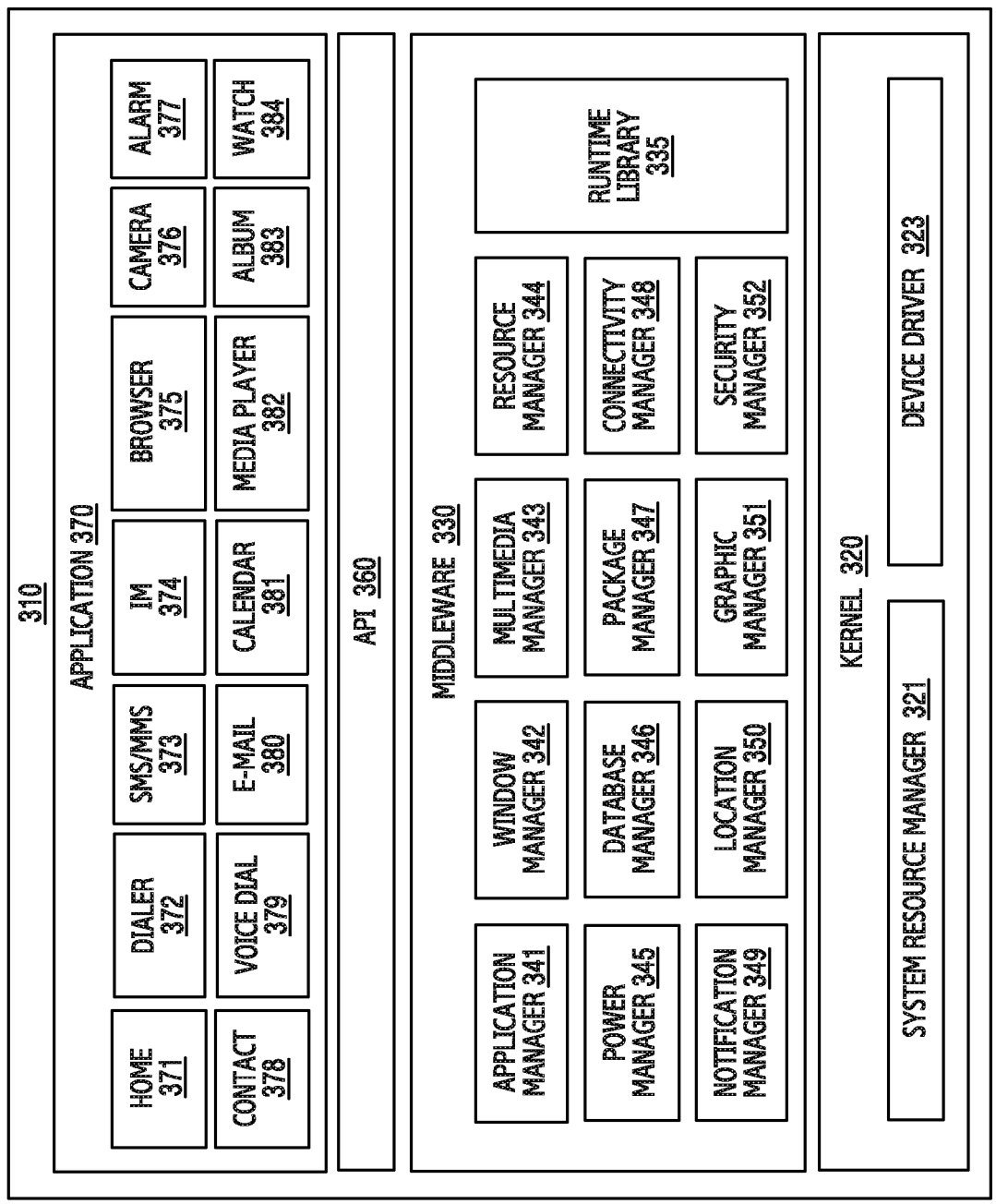
FIG. 3 illustrates a block diagram of a program module according to various embodiments of the present disclosure.

FIG. 3 is a block diagram illustrating an example program module according to various example embodiments of the present disclosure.

According to an embodiment of the present disclosure, the program module 310 (e.g., the program 140) may include an Operating System (OS) for controlling resources related to the electronic device (e.g., the electronic device 101) and/or various applications (e.g., the application programs 147) executed in the operating system. The operating system may be, for example, Android™, iOS™, Windows™, Symbian™, Tizen™, Bada™, or the like.

The program module 310 may include a kernel 320, middleware 330, an API 360, and/or applications 370. At least some of the program module 310 may be preloaded on an electronic device, or may be downloaded from an external electronic device (e.g., the electronic device 102 or 104, or the server 106).

The kernel 320 (e.g., the kernel 141) may include, for example, a system resource manager 321 and/or a device driver 323. The system resource manager 321 may control, allocate, or collect system resources. According to an embodiment of the present disclosure, the system resource manager 321 may include a process management unit, a memory management unit, a file system management unit, and the like. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver.

For example, the middleware 330 may provide a function required in common by the applications 370, or may provide various functions to the applications 370 through the API 360 so as to enable the applications 370 to efficiently use the limited system resources in the electronic device. According to an example embodiment of the present disclosure, the middleware 330 (e.g., the middleware 143) may include at least one of a run time library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while an application 370 is being executed. The runtime library 335 may perform input/output management, memory management, the functionality for an arithmetic function, or the like.

The application manager 341 may manage, for example, a life cycle of at least one of the applications 370. The window manager 342 may manage Graphical User Interface (GUI) resources used by a screen. The multimedia manager 343 may recognize a format required for reproduction of various media files, and may perform encoding or decoding of a media file by using a codec suitable for the corresponding format. The resource manager 344 may manage resources of a source code, a memory, and a storage space of at least one of the applications 370.

The power manager 345 may operate together with, for example, a Basic Input/Output System (BIOS) or the like to manage a battery or power source and may provide power information or the like required for the operations of the electronic device. The database manager 346 may generate, search for, and/or change a database to be used by at least one of the applications 370. The package manager 347 may manage installation or an update of an application distributed in a form of a package file.

For example, the connectivity manager 348 may manage wireless connectivity such as Wi-Fi or Bluetooth. The notification manager 349 may display or notify of an event such as an arrival message, promise, proximity notification, and the like in such a way that does not disturb a user. The location manager 350 may manage location information of an electronic device. The graphic manager 351 may manage a graphic effect which will be provided to a user, or a user interface related to the graphic effect. The security manager 352 may provide all security functions required for system security, user authentication, or the like. According to an embodiment of the present disclosure, when the electronic device (e.g., the electronic device 101) has a telephone call function, the middleware 330 may further include a telephony manager for managing a voice call function or a video call function of the electronic device.

The middleware 330 may include a middleware module that forms a combination of various functions of the above-described components. The middleware 330 may provide a module specialized for each type of OS in order to provide a differentiated function. Further, the middleware 330 may dynamically remove some of the existing components or add new components.

The API 360 (e.g., the API 145) is, for example, a set of API programming functions, and may be provided with a different configuration according to an OS. For example, in the case of Android™ or iOS™, one API set may be provided for each platform. In the case of Tizen™, two or more API sets may be provided for each platform.

The applications 370 (e.g., the application programs 147) may include, for example, one or more applications which may provide functions such as a home 371, a dialer 372, an SMS/MMS 373, an Instant Message (IM) 374, a browser 375, a camera 376, an alarm 377, a contact 378, a voice dial 379, an email 380, a calendar 381, a media player 382, an album 383, a watch 384. According to various example embodiments, the application 370 may include an application for providing a health care (e.g., for measuring exercise quantity or blood sugar, etc.), or environment information (e.g., providing atmospheric pressure, humidity, or temperature information).

According to an example embodiment of the present disclosure, the applications 370 may include an application (hereinafter, referred to as an "information exchange application" for convenience of description) that supports exchanging information between the electronic device (e.g., the electronic device 101) and an external electronic device (e.g., the electronic device 102 or 104). The information exchange application may include, for example, a notification relay application for transferring specific information to an external electronic device or a device management application for managing an external electronic device.

For example, the notification relay application may include a function of transferring, to the external electronic device (e.g., the electronic device 102 or 104), notification information generated from other applications of the electronic device 101 (e.g., an SMS/MMS application, an e-mail application, a health management application, or an environmental information application). Further, the notification relay application may receive notification information from, for example, an external electronic device and provide the received notification information to a user.

The device management application may manage (e.g., install, delete, or update), for example, at least one function of an external electronic device (e.g., the electronic device 102 or 104) communicating with the electronic device (e.g., a function of turning on/off the external electronic device itself (or some components) or a function of adjusting the brightness (or a resolution) of the display), applications operating in the external electronic device, and services provided by the external electronic device (e.g., a call service or a message service).

According to an example embodiment of the present disclosure, the applications 370 may include applications (e.g., a health care application of a mobile medical appliance or the like) designated according to an external electronic device (e.g., attributes of the electronic device 102 or 104). According to an embodiment of the present disclosure, the applications 370 may include an application received from an external electronic device (e.g., the server 106, or the electronic device 102 or 104). According to an embodiment of the present disclosure, the applications 370 may include a preloaded application or a third party application that may be downloaded from a server. The names of the components of the program module 310 of the illustrated embodiment of the present disclosure may change according to the type of operating system.

According to various example embodiments, at least a part of the programming module 310 may be implemented in software, firmware, hardware, or a combination of two or more thereof. At least some of the program module 310 may be implemented (e.g., executed) by, for example, the processor (e.g., the processor 1410). At least some of the program module 310 may include, for example, a module, a program, a routine, a set of instructions, and/or a process for performing one or more functions.

The term "module" as used herein may, for example, refer to a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of a dedicated processor, a CPU, an Application-Specific Integrated Circuit (ASIC) chip, a Field-Programmable Gate Arrays (FPGA), and a programmable-logic device for performing operations which has been known or are to be developed hereinafter.

According to various example embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable recoding media may be, for example, the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

Any of the modules or programming modules according to various example embodiments of the present disclosure may include at least one of the above described elements, exclude some of the elements, or further include other additional elements. The operations performed by the modules, programming module, or other elements according to various embodiments of the present disclosure may be executed in a sequential, parallel, repetitive, or heuristic manner. Further, some operations may be executed according to another order or may be omitted, or other operations may be added.

Proposed various embodiments of the present disclosure relate to a display method and apparatus, in which image processing for a main area and sub-area is shared and performed by a main processor (e.g., an AP) and a sub-processor (e.g., a display control circuit (e.g., a display driver ID (DDI)) in an electronic device that can operate a display by dividing a display area into a main area and a sub-area. For example, in an electronic device having a bent display (e.g., an electronic device to which a single edge or two or more edges (e.g., a dual-edge) is applied), a main processor may display the standard resolution (e.g., 16:9) through a main area (e.g., a front surface area), while a sub-processor is displaying an additional image (e.g., a virtual image) through a sub-area (e.g., an edge part of a side surface), so that a screen is enlarged (e.g., 16:10 and 16:11) and a bezel area is minimized.

The device, according to the various embodiments, may include all information and communication devices, multimedia devices, wearable devices, and application devices thereof that support a display function and use one or more of various processors, such as an Application Processor (AP), a Communication Processor (CP), a Graphic Processing Unit (GPU), a Central Processing Unit (CPU), and the like.

Hereinafter, the display method and device, according to the various embodiments, will be described with reference to the accompanying drawings. However, since the various embodiments are not restricted or limited by the following description, it should be noted that applications may be made to the various embodiments based on embodiments that will be described below. Hereinafter, various embodiments of the present disclosure will be described based on an approach of hardware. However, various embodiments of the present disclosure include a technology that uses both hardware and software and thus, the various embodiments of the present disclosure may not exclude the perspective of software.

Figure 4:
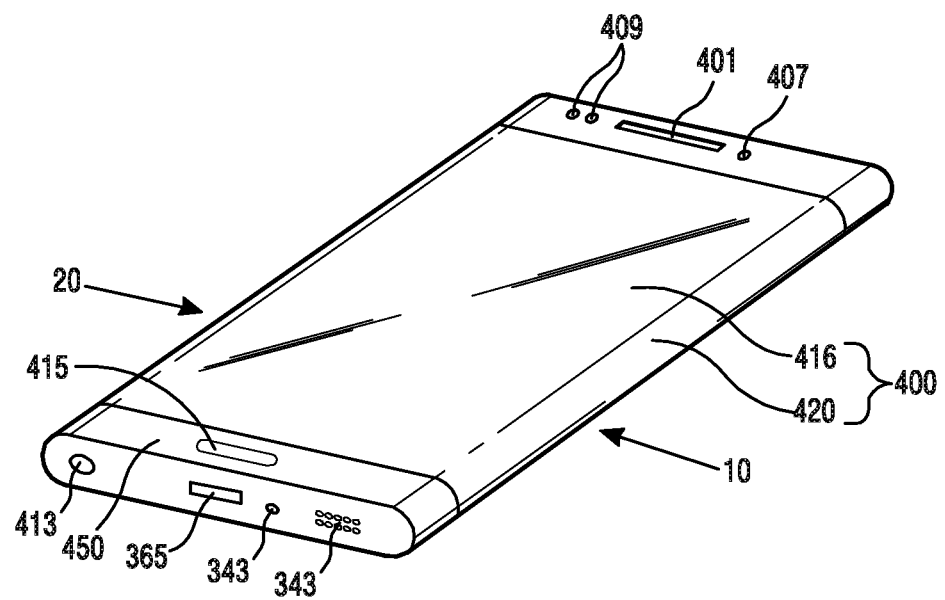
FIG. 4 illustrates a diagram for an example of an electronic device having a bent display according to various embodiments of the present disclosure.

FIG. 4 is a diagram illustrating an example of an electronic device having a bent display according to various embodiments of the present disclosure.

As illustrated in FIG. 4, an electronic device includes a bent display 400, a housing (or a main body) 450 having the bent display 400 seated therein and coupled thereto, an additional apparatus that is formed in the housing 450 in order to perform a function of the electronic device, and the like. In various embodiments, the additional apparatus may include a first speaker 401, a second speaker 403, a microphone 405, a sensor (e.g., a front camera module 407, an illuminance sensor 409, etc.), a communication interface (e.g., a charging-or-data input/output port 411, an audio input/output port 413, etc.), a button 415, and the like. In various embodiments, examples are described in which the electronic device has the bent display 400, but the electronic device is not limited thereto. For example, in various embodiments of the present disclosure, the electronic device may include a flat display or a flexible display which may operate a display area as a main area and a sub-area.

In various embodiments, the bent display 400 may be curved, bent, or rolled without damage, through a flexible substrate that is thin as paper. In various embodiments of the present disclosure, the bent display 400 may be coupled to the housing 450 and maintain a bent form. In various embodiments of the present disclosure, the electronic device may be implemented as a display device that can be freely bent and unbent like a flexible display as well as a form such as the bent display 400. The bent display 400 may have the flexibility that enables folding and unfolding, by replacing, with a plastic film, a glass substrate that encloses a liquid crystal in a liquid crystal display (LCD), a light emitting diode (LED), an organic light emitting diode (OLED), an active matrix OLED (AMOLED), and the like.

In various embodiments, the bent display 400 may have a specific screen size (e.g., 3 inches, 4 inches, 4.65 inches, 4.8 inches, 5 inches, 6.5 inches, 7.7 inches, 8.9 inches, 10.1 inches, etc.) of an active matrix screen in accordance with the size of the electronic device. According to various embodiments, the bent display 400 may extend to at least one side (e.g., at least one side of the left, right, top, and bottom side) of the electronic device, and may be bent to an operable curvature radius (e.g., a curvature radius of 5 cm, 1 cm, 7.5 mm, 5 mm, 4 mm, and the like) or less to be coupled to the side surface of the housing 450. However, the present disclosure is not limited thereto, and the bent display 400 according to various embodiments may be implemented in a rectangular shape having no curvature radius.

In various embodiments of the present disclosure, an area which appears on the front of the bent display 400 may be referred to as a main area 416, and an area which extends from the main area 416 and is bent to at least one side (e.g., reference numerals 10 and 20 of FIG. 4) of the housing 450 so as to appear on the side surface of the housing 450 may be referred to as a sub-area 420.

In various embodiments, the main area 416 and the sub-area 420 are divided for convenience of description and do not mean a physically divided form. According to various embodiments, the main area 416 and the sub-area 420 may have a form in which at least one end thereof is bent, and may be implemented by the single bent display 400 having the at least one end extending to the at least one side surface of the electronic device. According to various embodiments, at least one end that is bent depending on an implementation scheme may be implemented extending to the rear surface of the electronic device.

In various embodiments, the processor (e.g., Application Processor (AP)) of the electronic device may function for image processing by the main area 416. In various embodiments, a display control circuit (e.g., a Display Driver IC (DDI)) of the electronic device, which provides an electrical signal (e.g., a Multi-High Voltage Level (MHVL) signal) to a display panel (not shown), may be responsible for the sub-area 420. In various embodiments, the processor and the display control circuit perform distributed image processing for the main area 416 and sub-area 420 so that current consumption of the processor, which is consumed for image processing for display, may be decreased.

In various embodiments, the bent display 400 may support inputs and outputs, and may simultaneously or separately process inputs and outputs performed by the main area 416 and the sub-area 420. In various embodiments, examples of image processing operations for the main area 416 and the sub-area 420 will be described with reference to the drawings described below.

According to various embodiments, in the case where the main area 416 is not used, such as when the main area 416 is covered by a cover (not shown) of the electronic device, the processor may output the main area 416 in a single color (e.g., a block color or the like), or may divide power of the main area 416 and power of the sub-area 420 and cut off power supply to the main area 416, so as to stop performing display. In such a case, the display control circuit may process and display an image to be displayed in the sub-area 420 according to an operation of the sub-area 420.

Further, according to various embodiments, a right-hand mode and left-hand mode of the electronic device may be defined using preference setting provided in the electronic device, a separate application, or a user's grasp state sensing. Further, the electronic device may process an input and an output by using only the sub-area 420 of the side surface, which corresponding to the mode of the electronic device. For example, in the example of FIG. 4, an input and an output are performed through the sub-area 420 of the right surface 10 when the electronic device is set in the right-hand mode, and an input and an output are performed through the sub-area 420 of the left surface 20 when the electronic device is set in the left-hand mode.

Figure 5A:
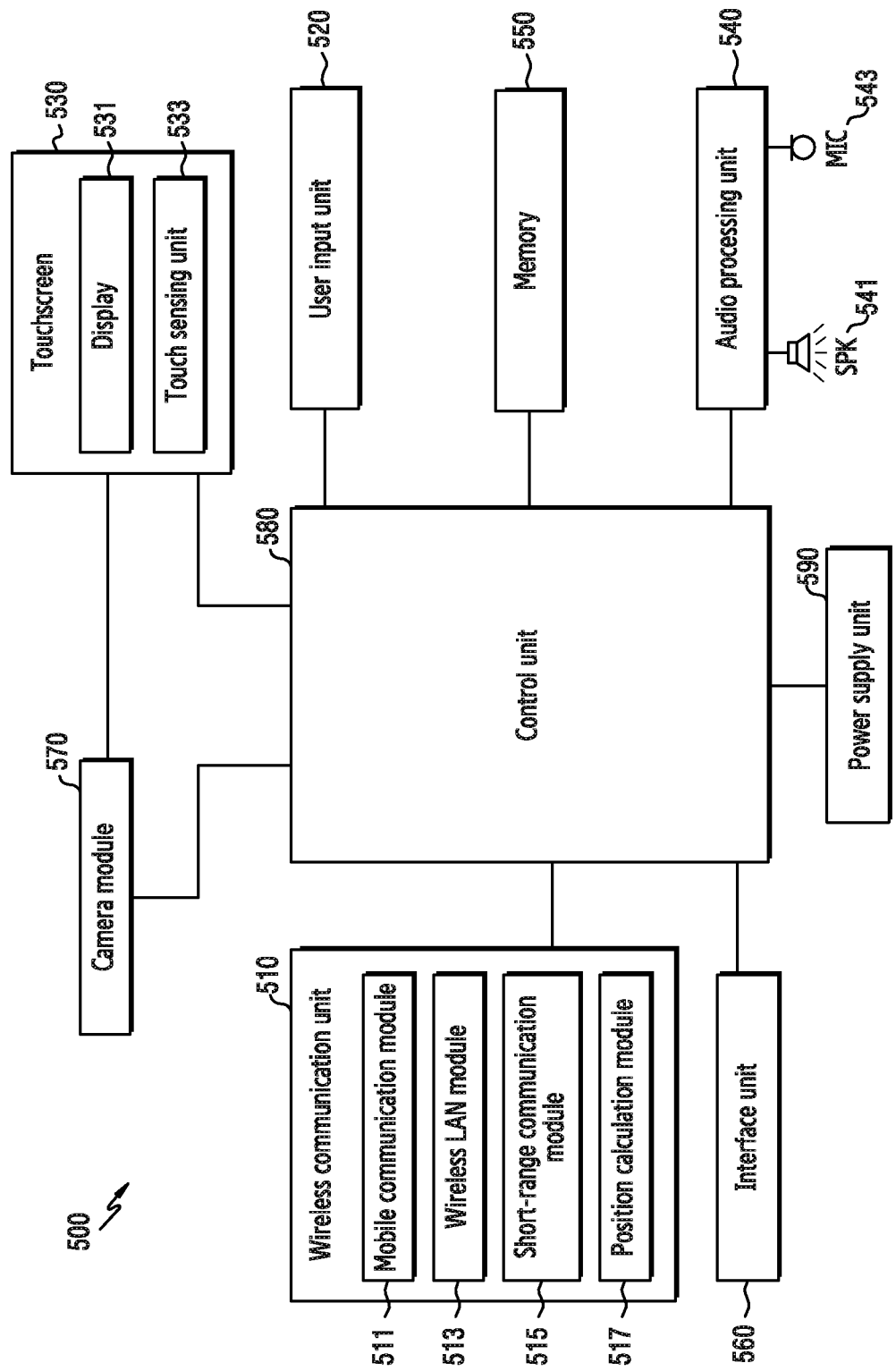
FIGS. 5A and 5B illustrate schematic diagrams for a configuration of an electronic device according to various embodiments of the present disclosure.

FIG. 5A is a diagram schematically illustrating a configuration of an electronic device according to various embodiments of the present disclosure.

Referring to FIG. 5A, an electronic device 500 according to various embodiments of the present disclosure may include a wireless communication unit 510, a user input unit 520, a touchscreen 530, an audio processing unit 540, a memory 550, an interface unit 560, a camera module 570, a control unit 580 (or a processor), and a power supply unit 590. In various embodiments of the present disclosure, the elements illustrated in FIG. 5A are not essential, and the electronic device 500 may be thus implemented to have more elements or less elements than the elements illustrated in FIG. 5A.

The wireless communication unit 510 may include a configuration identical or similar to that of the communication module 220 of FIG. 2. The wireless communication unit 510 may include one or more modules enabling wireless communication between the electronic device 500 and an external electronic device. For example, the wireless communication unit 510 may include a mobile communication module 511, a Wireless Local Area Network (WLAN) module 513, a short-range communication module 515, and a location calculation module 517. According to various embodiments, the wireless communication unit 510 may include a module (e.g., a short-range communication module, a long-range communication module, or the like) for performing communication with a neighboring external electronic device.

The wireless communication unit 511 may include a configuration identical or similar to that of the cellular module 221 of FIG. 2. The mobile communication module 511 may transmit a wireless signal to or receive a wireless signal from at least one of a base station, an external electronic device (e.g., the electronic device 104), and various servers (e.g., an integration server, a provider server, a content server, an Internet server, a cloud server, and the like) over a mobile communication network. The wireless signal may include a voice signal, a data signal, or various forms of control signals. The mobile communication module 411 may transmit various pieces of data required to operations of the electronic device 500 to the external device (e.g., the server 106, another electronic device 104, or the like), in response to a user's request.

The wireless LAN module 513 may include a configuration identical or similar to that of the WIFI module 223 of FIG. 2. The WLAN module 513 may indicate a module for establishing a wireless Internet access and a wireless LAN link with another electronic device (e.g., the electronic device 102 or the server 106). The WLAN module 513 may be mounted inside or outside the electronic device 500. Wireless Internet technology may include Wireless Fidelity (Wi-Fi), Wireless Broadband (Wibro), World Interoperability For Microwave Access (WiMax), High Speed Downlink Packet Access (HSDPA), Millimeter Wave (mmWave), or the like. The WLAN module 513 may be linked to an external electronic device connected to the electronic device 500 through a network (e.g., a wireless Internet network) and may transmit various pieces of data of the electronic device 500 to or receive the same from the outside (e.g., the external electronic device or the server). The wireless LAN module 513 may be kept turned on at all times, or may be turned on or turned off according to a setting of the electronic device 500 or a user input.

The short-range communication module 515 may be a module for performing short-range communication. Bluetooth, Bluetooth Low Energy (BLE), Radio Frequency Identification (RFID), Infrared Data Association (IrDA), Ultra Wideband (UWB), ZigBee, Near Field Communication (NFC), or the like may be used as a short-range communication technology. The short-range communication module 515 may be linked with another external electronic device connected with the electronic device 500 through a network (e.g., a short-range communication network) so as to transmit various pieces of data of the electronic device 500 to or receive the same from the external electronic device. The short-range communication module 515 may be kept turned on at all times, or may be turned on or turned off according to a setting of the electronic device 500 or a user input.

The location calculating module 517 may include a configuration identical or similar to that of the GNSS module 227 of FIG. 2. The location calculation module 517 may be a module for obtaining a location of the electronic device 500, and may include a Global Position System (GPS) module as a representative example. The location calculation module 517 may measure the location of the electronic device 500 through a triangulation principle.

The user input unit 520 may generate input data for controlling an operation of the electronic device 500 in response to a user input. The user input unit 520 may include at least one input means for detecting various user inputs. For example, the user input unit 520 may include a keypad, a dome switch, a physical button, a touch pad (resistive type/capacitive type), a jog & shuttle, and a sensor (e.g., the sensor module 240).

The user input unit 520 may be implemented in the form of a button located outside the electronic device 500 or some or all of the user input unit 120 may be implemented in the form of touch panel. The user input 520 may receive a user input for initiating an operation (e.g., a display processing operation by distinguishing between a main area and a sub-area) of the electronic device 500 according to various embodiments of the present disclosure, and may generate an input signal according to a user input The touchscreen 530 may indicate an input/output device capable of simultaneously performing an input function and a display function, and may include the display 531 (e.g., the display 160 and 260) and a touch sensing unit 533. The touch screen 530 may provide an input/output interface between the electronic device 500 and the user, transfer a user's touch input to the electronic device 500, and serve as a medium that shows an output from the electronic device 500 to the user. The touch screen 530 may show a visual output to the user. The visual output may be shown in a form of text, graphics, video, and a combination thereof.

According to various embodiments of the present disclosure, the display 531 may display (output) various pieces of information processed by the electronic device 500. For example, the display 531 may display various user interfaces (UI) or graphic user interfaces (GUI) associated with use of the electronic device 500. The display 531 may use various displays (e.g., the display 160). In various embodiments, a bent display may be used for the display 531.

According to various embodiments of the present disclosure, the display 531 may include a display control circuit (e.g., a Display Driver IC (DDI)) (not shown) for providing an electrical signal (e.g., a Multi High Voltage Level (MHVL) signal) to a display panel (not shown). In various embodiments, the display control circuitry, which is a key element essential to the composition of the display 531 and is an IC that provides a driving signal and data, as an electrical signal (e.g., an MHVL signal), to the display 531 so that an image (e.g., texts, pictures, still images, videos, etc.) is displayed on the screen, may indicate a circuit that drives various types of displays, such as an LCD, a PDP, an OLED, and the like.

The touch sensing unit 533 may be mounted on the display 531, and may detect a user input that is in contact with or in proximity to the surface of the touch screen 530. The user input may include a touch event or a proximity event, which is input based on at least one of a single-touch, a multi-touch, a hovering, or an air gesture. In various embodiments of the present disclosure, the touch sensing unit 533 may receive a user input for initiating an operation related to the use of the electronic device 500 and may generate an input signal according to the user input.

The audio processor 540 may include a configuration identical or similar to that of the audio module 280 of FIG. 2. The audio processing unit 540 may perform a function of transmitting an audio signal received from the control unit 580 to a speaker (SPK) 541 and transferring an audio signal such as a voice or the like, which is received from a microphone 543, to the control unit 580. The audio processing unit 540 may convert voice/sound data into an audible sound through the speaker 541 based on the control of the control unit 580, output the audible sound, convert an audio signal such as a voice or the like which is received from the microphone 543 into a digital signal, and transfer the digital signal to the control unit 580.

The speaker 541 may output audio data that is received from the wireless communication unit 510 or stored in the memory 550. The speaker 541 may output a sound signal associated with various operations (functions) executed by the electronic device 500.

The microphone 543 may receive an external sound signal and process the same into electrical voice data. Various noise reduction algorithms may be implemented in the microphone 543 to remove noise generated in the process of receiving an external sound signal. The microphone 543 may serve to input an audio stream, such as a voice command (e.g., a voice command for initiating display processing by division into a main area and a sub-area).

The memory 550 (e.g., the memory 130 or 230) may store one or more programs that are executed by the control unit 580, and may execute a function for temporarily storing input/output data. The input/output data may include, for example, video, image, photo, and audio files. The memory 550 may serve to store acquired data, and may store data acquired in real time in a temporary storage device and data, which is decided to be stored, in a storage device which may store the data for a long time.

The memory 550 may store one or more programs and data associated with execution of a display function by division of the main area and the sub-area of the display 531 of the electronic device 500. For example, in the various embodiments of the present disclosure, the memory 550 may store instructions that causes the processor (e.g., an AP) to determine image processing of the main area and causes the display control circuit (e.g., a DDI) to determine image processing of the sub-area. The memory 550 may include one or more application modules (or a software module), and the like. The application module may include instructions for displaying data based on the main area and the sub-area of the display 531.

The interface unit 560 may have a configuration identical or similar to that of the interface 270 of FIG. 2. The interface unit 560 may receive data or power from an external electronic device, and may transfer the same to each element included in the electronic device 500. The interface unit 560 may enable the data within the electronic device 500 to be transmitted to an external electronic device. For example, the interface unit 560 may include a wired/wireless headset port, an external charger port, a wired/wireless data port, a memory card port, a port for connecting a device provided with an identification module, an audio input/output port, a video input/output port, an earphone port, and the like.

The camera module 570 (e.g., the camera module 291) may indicate a configuration that supports a photographing function of the electronic device 500. The camera module 570 may photograph a predetermined subject according to a control of the control unit 580 and transmit photographed data (e.g., an image) to the display 531 and the control unit 580.

The control unit 580 may control a general operation of the electronic device 500. In various embodiments, the control unit 580 may have a configuration identical or similar to that of the processor 210 of FIG. 2. In various embodiments, the control unit 580 may sense initiation of an operation that displays a specific image on the display 531. For example, the control unit 580 may determine initiation of an operation for display in response to sensing an image display request made by a user, sensing turning-on of the display 531, or the like. The control unit 580 may determine, by checking an image transfer scheme in response to the initiation of the display operation, whether an image transfer corresponds to a full resolution (e.g., 2560*1600) image (e.g., an image for the entire display area including a main area and a sub-area) transfer or a light resolution (e.g., 2560*1440) image (e.g., an image for a part of the entire display area (e.g., main area)) transfer. For example, the control unit 580 may determine, by referring to configuration information pre-stored in the memory 550, whether an image transfer corresponds to an image transfer by image processing suitable for a full resolution (e.g., 2560*1600) or an image transfer by image processing suitable for the main area (e.g., 2560*1440).

When a full resolution (e.g., 2560*1600) image transfer is determined, the control unit 580 may generate a full resolution image through image processing for display by a full resolution image, and may transfer the full resolution image and control information for display of a full resolution image to the display control circuit (e.g., a DDI).

When a light resolution (e.g., 2560*1440) image transfer is determined, the control unit 580 may generate a light resolution image through image processing for display by a light resolution image, and may transfer the light resolution image (e.g., an image for a main area) and control information for display of a light resolution image to the display control circuit (e.g., a DDI). According to various embodiments, the control information for display of a light resolution image may include information associated with image processing for the sub-area in addition to display information of the main area.

The control unit 580 may include one or more processors for controlling an operation of the electronic device 500. In various embodiments, the control unit 580 may control an operation of a hardware-wise module, such as the interface unit 560 and the display 531. A control operation of the control unit 580 according to the various embodiments of the present disclosure will be described in details with reference to the drawings described below.

According to the various embodiments of the present disclosure, the control unit 580 may perform an image processing operation for display of the electronic device 500 in accordance with various embodiments of the present disclosure in conjunction with software modules stored in the memory 550. According to various embodiments of the present disclosure, the control unit 580 may be embodied as one or more processors that control the operations of the electronic device 500 according to various embodiments of the present disclosure by executing one or more programs stored in the memory 550.

The power supply unit 590 may receive external power or internal power based on the control of the control unit 580, and may supply power required for the operation of each element. In the various embodiments of the present disclosure, the power supply unit 590 may supply or cut off power supplied to the display 531, the camera module 570, and the like under the control of the control unit 580.

Various embodiments described in the present disclosure may be implemented in a computer or a similar device-readable recording medium through software, hardware or a combination thereof.

Figure 5B:
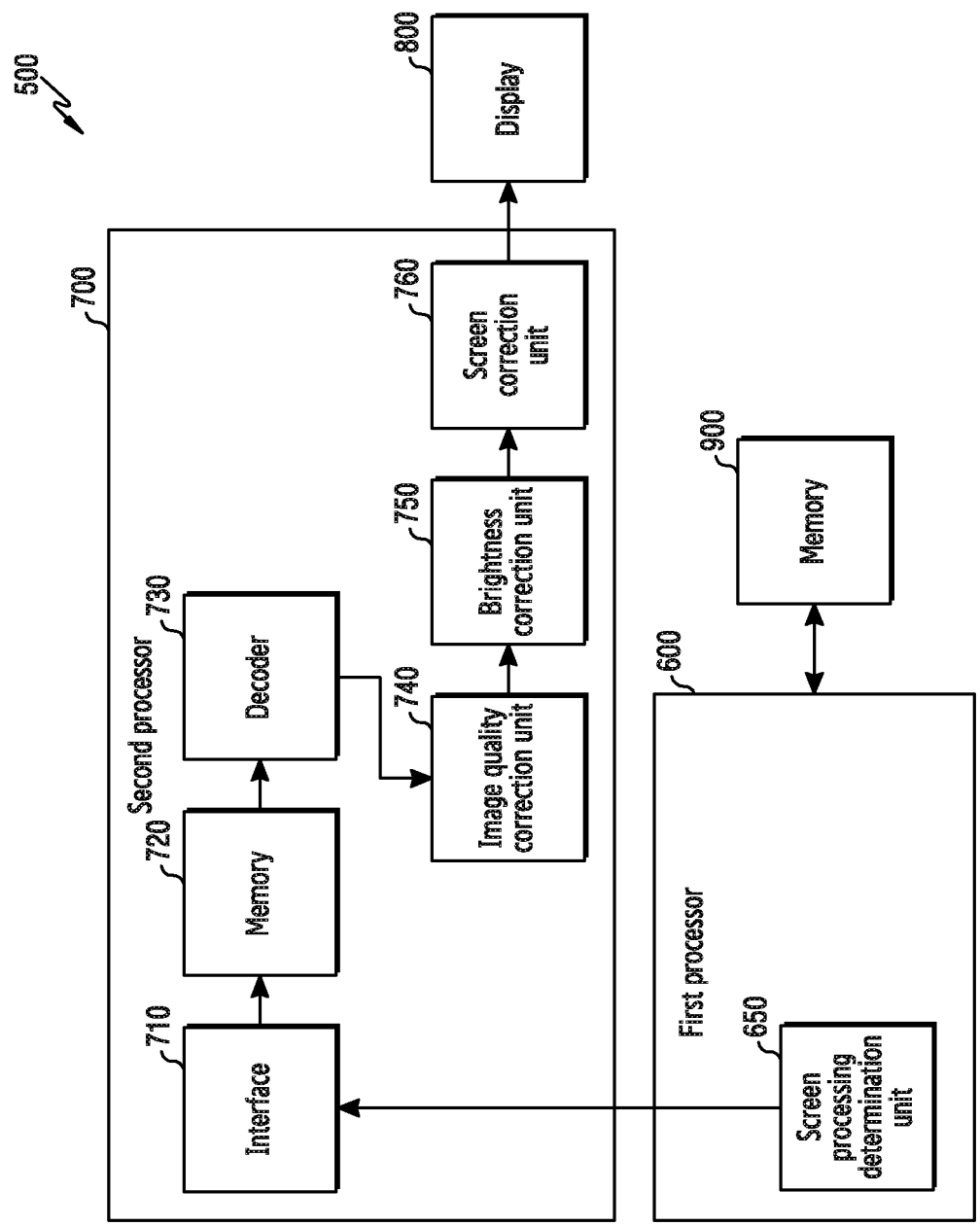

FIG. 5B is a diagram schematically illustrating a configuration of an electronic device according to various embodiments of the present disclosure.

Referring to FIG. 5B, various embodiments describe operations of sharing and performing image processing for a first area (a main area) and at least one second area (a sub-area) of a display 800, by a first processor 600 and a second processor 700.

Referring to FIG. 5B, the electronic device 500 according to various embodiments of the present disclosure may include the first processor 600, the second processor 700, the display 800, and a memory 900.

In various embodiments, the display 800 may include a first area (e.g., a main area of the front surface of the electronic device 500) which is exposed to one surface of the housing (e.g., reference numeral 450 of FIG. 4) and is flat, and a second area (e.g., a sub-area of the side surface of the electronic device 500) which extends from the first area and at least a part of which is bent. In various embodiments, the display 800 may divide a screen into the first area and the second area to display the screen. In various embodiments, the second area may be an edge part of a bent display, a folded surface of a flexible display, or a sub-area distinguished in a flat display.

In various embodiments, the first processor 600 may have a configuration identical or similar to that of the processor 210 of FIG. 2 or the control unit 580 of FIG. 5A. For example, the first processor 600 may be implemented as an application processor (AP). In various embodiments, the first processor 600 may perform processing to cause the screen to be displayed in the first area of the display 800 or the first area and second area of the display 800 in response to a user setting. According to an embodiment, the first processor 600 may determine a display scheme on the basis of a user's display use setting (e.g., whether at least one second area of the display 800 is used). The first processor 600 may perform image processing for display corresponding to the first area when it is determined to use the first area, and may generate control information according thereto. The first processor 600 may perform image processing for display corresponding to the first area and the second area when it is determined to use the first area and the second area, and may generate control information according thereto. The first processor 600 may transfer the processed image and control information to the second processor 700. In various embodiments, the first processor 600 may further include a screen processing determination unit 650 that determines whether to use display by the first area or display by the first area and second area.

In various embodiments, the second processor 700 may be implemented, for example, as a Display Driver Integrated Circuit (DDI). In various embodiments, the second processor 700 may receive an image and control information for display processing from the first processor 600. The second processor 700 may determine a display scheme on the basis of the received control information.

According to various embodiments, the second processor 700 may transfer the received image, as it is, to the display 800 when the display by the first area and second area of the display 800 is determined based on the control information.

According to various embodiments, the second processor 700 may generate a virtual image by specific processing (pixel extension, gradation, blur, or the like) for the second area based on the control information when the display by the second area of the display 800 is determined based on the control information. The second processor 700 may transfer an image for the first area, which is received from the first processor 600, and the specifically processed virtual image to the display 800.

In various embodiments, the second processor 700 may be implemented including an interface 710, a memory 720, a decoder 730, an image quality correction unit 740, a brightness correction unit 750, a screen correction unit 760, and the like.

The interface 710 may include a serial interface (e.g., Mobile Industry Processor Interface Display Serial Interface (MIPI DSI)). According to various embodiments, the interface 710 may transmit a command (e.g., control information) and data (e.g., an image) to the first processor 600 (e.g., the screen processing determination unit 650).

The memory 720 may include, for example, a frame buffer. According to various embodiments, the memory 720 may record (e.g., buffering) an image transferred through the interface 710 (e.g., recording a screen display area), and may be referred to as a video buffer, a video memory, a video ram, and the like.

The decoder 730 may convert, for example, a coded image into an original form.

The image quality correction unit 740, the brightness correction unit 750, and the screen correction unit 760 may correct the image quality, brightness, or screen of an image to be displayed through the display 800.

In various embodiments, the memory 900 may have a configuration identical or similar to that of the memory 230 of FIG. 2 or that of the memory 550 of FIG. 4. According to various embodiments, the memory 900 may be implemented as at least one memory electronically connected with at least one processor (e.g., the first processor 600) among two processors (e.g., the first processor 600 and the second processor 700).

According to various embodiments, the memory 900 may store first instructions that cause, when executed, a first processor 600 among the at least two processors to display a screen in the first area and the second area of the display 800. According to various embodiments, the memory 900 may store second instructions that cause, when executed, a second processor 700 among the at least two processors to display a screen in the second area of the display 800 without displaying the screen in the first area of the display 800.

According to various embodiments, the memory 900 may be implemented including a first memory (not shown) and a second memory (not shown) which are configured to store the first instructions and the second instructions. According to various embodiments, the second memory that stores the second instructions may be implemented as the memory 720 arranged in the second processor 700.

According to various embodiments, current consumed by the first instructions in the first processor 600 may be less than current consumed by the second instructions in the second processor 700. Further description will be provided with reference to [TABLE 1] later.

As described above, according to various embodiments of the present disclosure, an electronic device may include: a housing; a display including a first area, which is exposed to one surface of the housing and is flat, and a second area, which extends from the first area and at least a part of which is bent; a second processor electrically connected with the display; a first processor electrically connected with the second processor; and at least one memory electrically connected with at least one of the first processor and the second processor, wherein the at least one memory is configured to store: first instructions that cause, when executed, the first processor to process data to be displayed in the first area of the display and provide the processed data to the second processor; and second instructions that cause, when executed, the second processor to process the data provided from the first processor and generate data to be displayed in the second area of the display.

In various embodiments, the first processor may be configured to include an application processor, and the second processor may be configured to include a display driver integrated circuit.

In various embodiments, a first memory among the at least one memory is configured to store the first instructions, and a second memory among the at least one memory is configured to store the second instructions. In various embodiments, the second memory may be configured to be disposed inside the second processor. In various embodiments, power consumed by the first instructions in the first processor may be less than power consumed by the second instructions in the second processor.

In various embodiments, the at least one memory may be configured to store the second instructions that cause, when executed, the second processor to display a screen in the second area without displaying the screen in the first area.

In various embodiments, the first processor may be configured to determine whether an image transfer scheme corresponds to a full resolution image transfer or a light resolution image transfer in response to an operation of initiating a specific image, and generate control information and an image corresponding to the determined image transfer scheme, so as to transfer the generated image and control information to the display control circuit.

In various embodiments, the first processor may be configured to: generate control information for display of a full resolution image and generate a full resolution image through image processing for display by a full resolution image when a full resolution image transfer is determined; and generate control information for display of a light resolution image and generate a light resolution image through image processing for display by a light resolution image when a light resolution image transfer is determined.

In various embodiments, the second processor may be configured to determine whether the image is a full resolution image or a light resolution image based on the control information when the image and control information for display is received from the first processor. In various embodiments, the second processor may be configured to transfer a full resolution image received without performing image processing therefor to the display in the case of a full resolution image, and to perform specific image processing and then transfer the received image and the processed image to the display in the case of a light resolution image.

In various embodiments, the second processor may be configured to determine image processing for a sub-area when the received image is a light resolution image. In various embodiments, the second processor may be configured to determine an image processing scheme to perform display through the sub-area based on the control information when the received image is determined to be a light resolution image, and to perform image processing based on at least a part of the received image in response to the determined processing scheme.

In various embodiments, the second processor may be configured to determine whether image processing for a sub-area is necessary on the basis of the control information, and to determine an image processing scheme for a virtual image and a sub-area for processing the virtual image on the basis of the control information when the image processing is determined. In various embodiments, the second processor may be configured to generate at least one virtual image for a sub-area through specific processing for both side surfaces or any one side surface of the sub-area by using the light resolution image received from the first processor, and to transfer a light resolution image and the virtual image to the display.

In various embodiments, an electronic device including a display divided into a main area and a sub-area may be configured to include: a display that includes a main area on the front surface and a sub-area on the side surface and displays an image received from a display control circuit based on at least a part of the main area and sub-area; a processor that processes a full resolution image corresponding to the main area and the sub-area or processes a light resolution image corresponding to the main area, so as to transfer the processed image to the display control circuit; and the display control circuit that transfers a full resolution image transferred from the processor to the display, or processes a virtual image for the sub-area and transfer the light resolution image transferred from the processor and the virtual image to the display.

According to various embodiments of the present disclosure, an electronic device may include: a housing; a display including a first area, which is exposed to one surface of the housing and is flat, and a second area, which extends from the first area and at least a part of which is bent; at least two processors electrically connected with the display; and at least one memory electrically connected with at least one of the at least two processors, wherein the at least one memory is configured to store first instructions that cause, when executed, a first processor among the at least two processors to display a screen in the first area and the second area, and the at least one memory is configured to store second instructions that cause, when executed, a second processor among the at least two processors to display a screen in the second area without displaying the screen in the first area.

Figure 6:
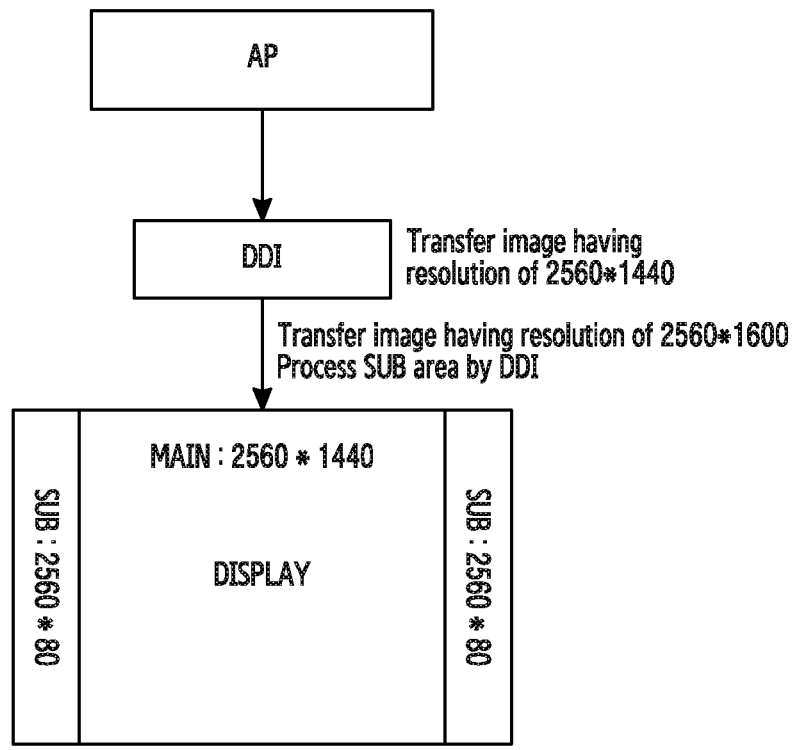
FIGS. 6 and 7 illustrate diagrams for a display operation of an electronic device according to various embodiments of the present disclosure.
Figure 7:
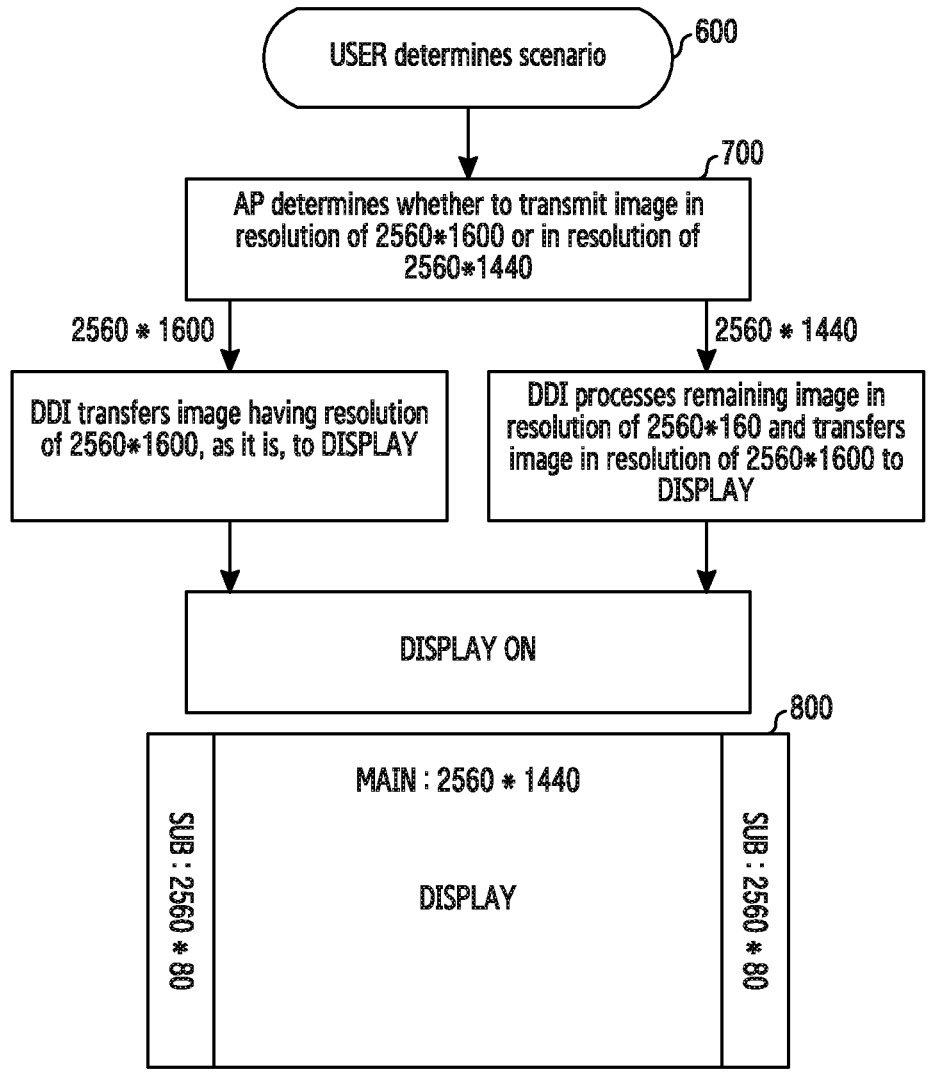

FIGS. 6 and 7 are diagrams illustrating a display operation of an electronic device according to various embodiments of the present disclosure.

According to various embodiments, FIGS. 6 and 7 illustrate an example of a case where the electronic device supports a full resolution of 2560*1600, a main area of the front surface supports a resolution of 2560*1440, each sub-area on both side surfaces supports a resolution of 2560*80, and the sum of the resolution of the sub-area corresponds to the full resolution. In various embodiments, the numerical values of the resolution are not limited to those used only for explaining a specific embodiment or for convenience of description, and may be variously implemented depending on the characteristics of a display or an electronic device.

Referring to FIGS. 6 and 7, the electronic device to which a bent display is applied may make a screen look larger by using the sub-area when a horizontal mode or a vertical mode is used. For example, when it is assumed that the electronic device supports a resolution of 2560*1440 through the main area of the front surface, the electronic device may expand a resolution of 2560*80 through each of the sub-areas on both side surfaces so as to support the overall resolution of 2560*1600 (e.g., 2056*(1440+80+80)). For example, the electronic device may expand 160 pixels by using all the sub-areas on both side surfaces, or may expand 80 pixels by using one of the sub-areas on the side surfaces.

According to various embodiments, the display for the main area may be processed by an Application Processor (AP) 600, and the display for the sub-areas may be processed by a Display Driver IC (DDI) 700.

Referring to FIGS. 6 and 7, the AP 600 may perform image processing for a resolution of 2560*1440 in the main area of the front surface, instead of performing image processing for a full resolution of 2560*1600 for an image for display, and a first image (a light resolution image) (e.g., an image having a resolution of 2560*1440) according to image processing may be transferred to the DDI 700. When the first image (a light resolution image) corresponding to the resolution of 2560*1440 in the main area is transferred from the AP 600, the DDI 700 may process a second image (a virtual image) (e.g., at least one image having a resolution of 2560*80) for performing display through the sub-areas based on the transferred first image. For example, the DDI 700 may make the screen look larger through specific processing for the sub-areas. According to an embodiment, DDI 700 may display the second image in the sub-area through specific processing, such as pixel extension, gradation, blur, or the like, based on the first image.

According to various embodiments, when a lock screen, Internet, and a specific image are displayed, the electronic device may distinguish between the AP 600 and the DDI 700 to independently perform image processing for the main area and the sub area in response to a use scenario for a bent display (e.g., a main area and a sub-area).

Meanwhile, when a display scheme is determined to use a full resolution image, the AP 600 may transfer a full resolution image (e.g., an image having a resolution of 2560*1600) to the DDI 700, and the DDI 700 may transfer a full resolution image, as it is, to the display 800 without an image processing operation for the sub-area when the full resolution image is transferred from the AP 600.

According to various embodiments, the display 800 may display the image transferred from the DDI 700, through the main area or through the main area and at least one sub-area.

FIGS. 8, 9, 10, and 11 are diagrams illustrating examples of displaying an image by using a main area and a sub-area in an electronic device according to various embodiments of the present disclosure.

Figure 8:
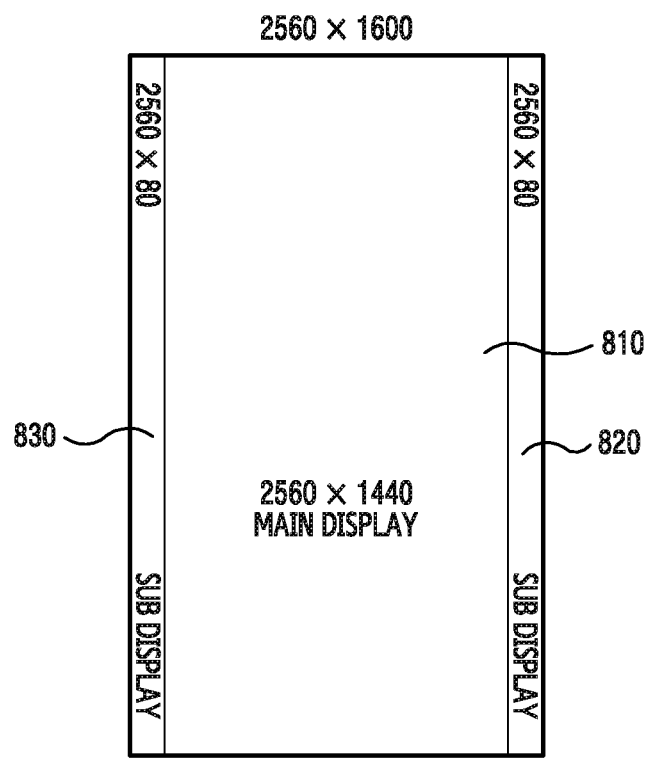
FIGS. 8, 9, 10, and 11 illustrate diagrams for examples of displaying an image by using a main area and a sub-area in an electronic device according to various embodiments of the present disclosure.

As illustrated in FIG. 8, it may be assumed that an electronic device provides a full resolution of 2560*1600 by a bent display. In various embodiments, a resolution of the bent display may be divided into a resolution (e.g., 2560*1440) of a main area 810 and resolutions (e.g., 2560*(80*2)) of sub-areas 820 and 830, and a full resolution may be determined by the sum of each resolution.

According to various embodiments, when the AP 600 processes only an image having a resolution of 2560*1440 for the main area 810 and transfers the processed image to the DDI 700, the DDI 700 may process the remaining 160 pixels (e.g., 80 pixels of a first sub-area 820 and 80 pixels of a second sub-area 830) so as to display the entire image having a resolution of 2560*1600.

Figure 9:
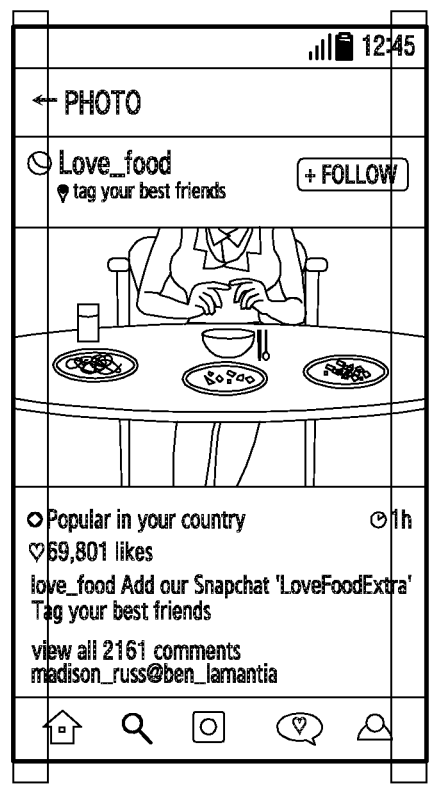

According to an embodiment, as illustrated in FIG. 9, with respect to a specific image (e.g., a lock screen, Internet, an image, or the like), the AP 600 may transfer an image for a resolution of 2560*1440 (a main area 810) and control information (e.g., using all sub-areas) according thereto in response to a user's display use setting (e.g., using all sub-areas). In various embodiments, the DDI 700 may arbitrarily process the sub-areas (2560*160) 820 and 830 on both side surfaces based on the control information so as to provide an effect of displaying an image having a resolution of 2560*1600. In various embodiments, the arbitrarily processing of the sub-areas 820 and 830 may be performed by the DDI 700 based on at least a part of the image (e.g., an image having a resolution of 2560*1440) transferred for the main area 810. According to an embodiment, the DDI 700 may perform image processing for the first sub-area 820 and the second sub-area 830 through specific processing (e.g., pixel extension, gradation, blur, or the like) in the right and left edge part of the transferred image.

According to various embodiments, when the AP 600 processes only an image having a resolution of 2560*1440 for the main area 810 and transfers the processed image to the DDI 700, the DDI 700 may process the remaining 80 pixels (e.g., 80 pixels of a first sub-area 820 or 80 pixels of a second sub-area 830, determined based on the control information) so as to display the entire image having a resolution of 2560*1520.

Figure 10:

According to an embodiment, as illustrated in FIG. 10, with respect to a specific image, the AP 600 may transfer an image for a resolution of 2560*1440 (a main area 810) and control information (e.g., using the right or left side of the sub-area) according thereto in response to a user's display use setting (e.g., using the right or left side of the sub-area). In various embodiments, the DDI 700 may arbitrarily process the sub-area (2560*80) (e.g., the first sub-area 820 or the second sub-area 830) of one side surface so as to provide an effect of displaying an image having a resolution of 2560*1520. The example of FIG. 10 describes a case where 80 pixels of the second sub-area 830 are arbitrarily processed and displayed based on the control information. In various embodiments, the arbitrarily processing of the second sub-area 830 may be performed by the DDI 700 based on at least a part of the image (e.g., an image having a resolution of 2560*1440) transferred for the main area 810. According to an embodiment, the DDI 700 may perform image processing for the second sub-area 830 through specific processing (e.g., pixel extension, gradation, blur, or the like) in the left edge part of the transferred image.

According to various embodiments, when the AP 600 processes only an image having a resolution of 2560*1440 for the main area 810 and transfers the processed image to the DDI 700, the DDI 700 may display the entire image having a resolution of 2560*1440 for the remaining 160 pixels (e.g., 80 pixels of a first sub-area 820 and 80 pixels of a second sub-area 830) without performing additional processing.

Figure 11:
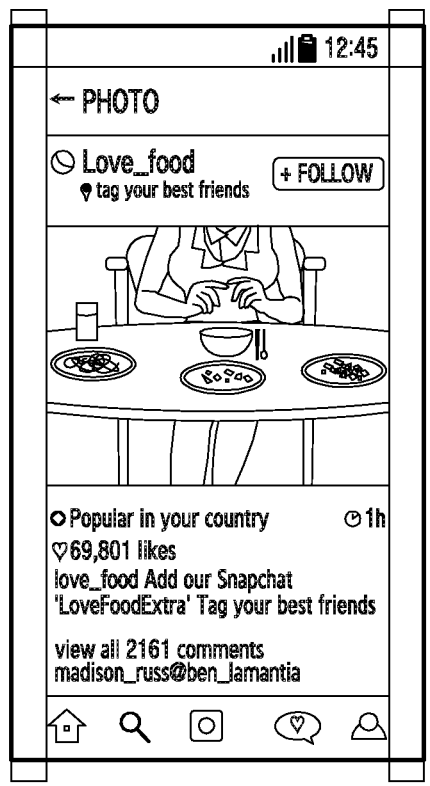

According to an embodiment, as illustrated in FIG. 11, with respect to a specific image, the AP 600 may transfer an image for a resolution of 2560*1440 (a main area 810) and control information (e.g., not using the sub-area) according thereto in response to a user's display use setting (e.g., not using the sub-area). In various embodiments, the DDI 700 may provide, based on the control information, an effect of displaying an image having a resolution of 2560*1440 without performing additional arbitrarily processing for the sub-areas 820 and 830.

Meanwhile, although not illustrated, the AP 600 performs image processing of a full resolution (2560*1660) image of the bent display and transfers the processed full resolution image to the DDI 700, the DDI 700 may transfer an image having a resolution of 2560*1600 to the display 800 without additional processing for the sub-areas 820 and 830.

According to various embodiments, the sub-areas 820 and 830 may be independently operated by the DDI 700. For example, the DDI 700 may turn on or turn off the sub-areas 820 and 830 independently of the main area 810 based on the control information received from the AP 600. According to various embodiments, the DDI 700 may turn on (see FIG. 9) both of the sub-areas 820 and 830. According to various embodiments, the DDI 700 may turn on only the sub-area (e.g., the second sub-area 830 of FIG. 10) of one side surface among the sub-areas 820 and 830, and may turn off the sub-area (e.g., the first sub-area 820 of FIG. 10) of the other side surface. According to various embodiments, the DDI 700 may turn off (see FIG. 11) both of the sub-areas 820 and 830.

According to various embodiments, as shown in description with reference to FIG. 6 to FIG. 11, the current consumed when the AP 600 performs image processing of a full resolution image may be decreased by performing distributed processing through the AP 600 and DDI 700, for an image for display of the display 800. For example, as shown in [TABLE 1], when the DDI 700 performs, instead of the AP 600, image processing for the sub-area, current consumption may be decreased compared to the case where the AP 600 performs image processing of a full resolution image.

TABLE 1

| Simulation | DDI Processing | AP Processing |
|---|---|---|
| AP Current | 24.78 mW | 324.78 mW |
| DDI Current | 199.5 mW | 194.5 mW |
| Panel Current | 823.1 mW | 823.1 mW |
| Total Current | 1047.38 mW | 1342.38 mW |
| Difference in Current | 295 mW | |

According to various embodiments, referring to [TABLE 1], when the AP 600 performs single image processing, the current consumption of the AP 600 may be 324.78 mW, and the current consumption of the DDI 700 may be 194.5 mW. On the other hand, when the AP 600 and the DDI 700 performs distributed image processing, the current consumption of the AP 600 may be 24.78 mW, and the current consumption of the DDI 700 may be 199.5 mW. In the case of a display panel (not shown), the identical current consumption of 823.1 mW may occur regardless of single processing or distributed processing. As an example of [TABLE 1], in the case of the total current consumption according to single processing or distributed processing, it may be seen that the increase in current consumption (e.g., 324.78 mW−24.78 mW=300 mW) of the AP 600 according to a single processing scheme is higher in comparison with the increase in current consumption (e.g., 199.5 mW−194.5 mW=5.0 mW) of the DDI 700 according to a distributed processing scheme. In other words, current consumed by the DDI 700 may be less than current consumed by the AP 600. As a result, when the AP 600 and the DDI 700 perform distributed processing, a gain of 295 mW out of the total current consumption may be achieved.

According to various embodiments, as in the above-described comparative example, when the AP 600 and the DDI 700 perform distributed image processing, the burden on the current consumption may be reduced, and a degree of UI or UX implementation freedom corresponding thereto may be increased. For example, a UX may be divided into a screen that requires specific processing for the sub-area and a screen that does not require specific processing for the sub-area, and the DDI 700 may perform image processing of the sub-area according to the divided UX and may display the processed sub-area.

According to an embodiment, when specific processing for the sub-area is not required based on the control information, a UX in which an image is displayed through only the main area instead of the entire area of the display area may be provided. Since the AP 600 processes only an image (e.g., a light resolution image) for the main area, current consumption may be reduced in comparison with image (e.g., a full resolution image) processing for the main area and the sub-area.

According to an embodiment, when specific processing for the sub-area is required based on the control information, the DDI 700 may provide a UX, in which an image having a different type from that of a standardized image may be provided, according to providing of an image by image processing (e.g., pixel extension, gradation, blur, and the like) based on the control information for the sub-area separately from the image in the main area. In the case of power consumption for image processing, since power consumed by the AP 600 is less than power consumed by the DDI 700, current consumption may be reduced with a visual effect.

Figure 12:
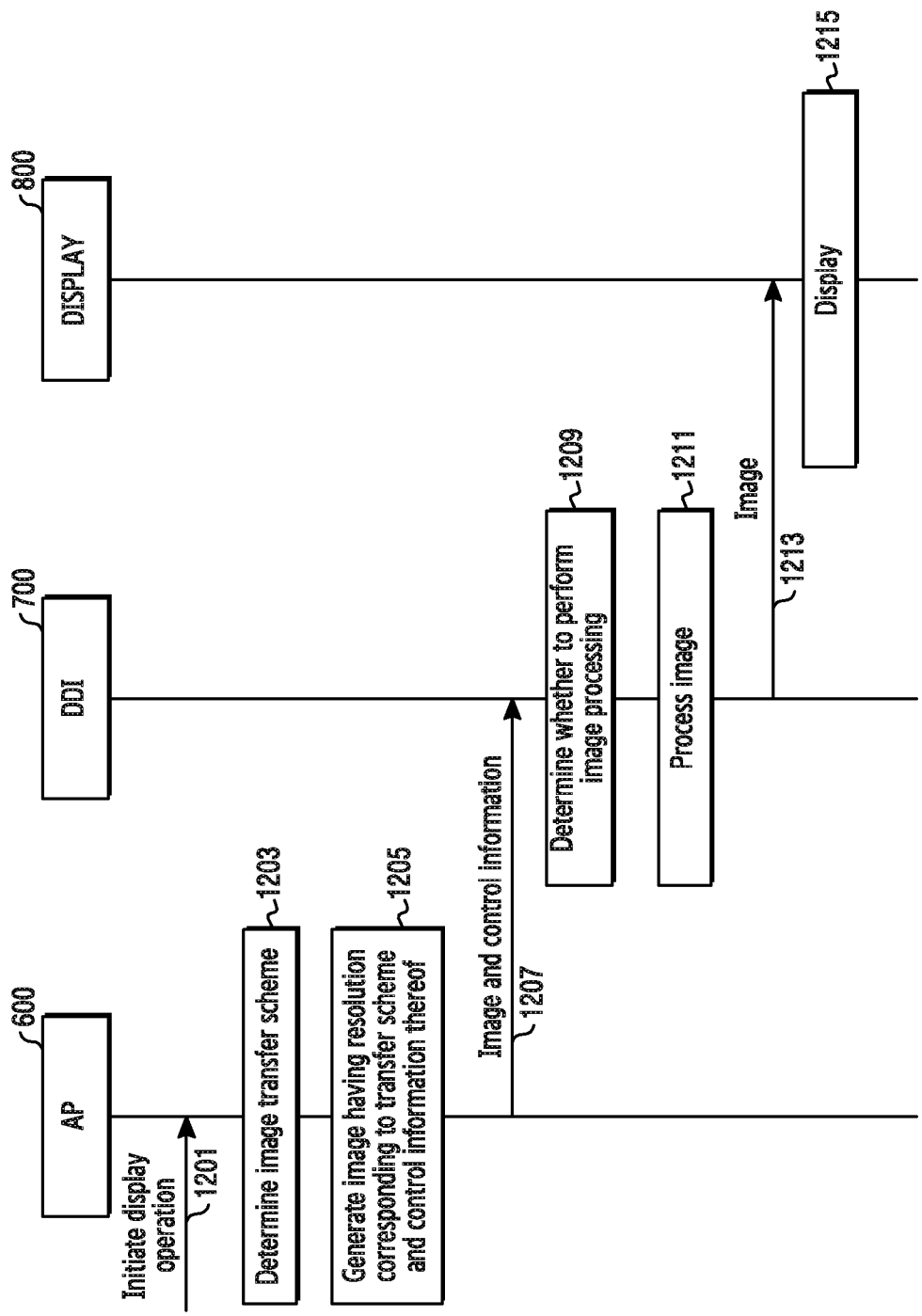
FIG. 12 illustrates a diagram for explaining a display processing operation in an electronic device according to various embodiments of the present disclosure.

FIG. 12 is a diagram for explaining a display processing operation in an electronic device according to various embodiments of the present disclosure.

Referring to FIG. 12, in operation 1201, the AP 600 may determine operation initiation of displaying a specific image. For example, the AP 600 may sense a specific image display request by a user, or may sense that the display 800 is turned on from a turned-off state. The AP 600 may determine that an operation for image display is initiated, in response to sensing of an image display request or sensing of turning-on of the display 800.

In operation 1203, when display operation initiation is determined, the AP 600 may determine an image transfer scheme. For example, a user may perform setting in advance through a display setting of the electronic device, such as a setting for use by division into a main area and a sub-area (or setting for using power saving mode), a setting for the sub-area to be used when using the sub-area (e.g., using all sub-areas, using the left sub-area, using the right sub-area, or using no sub-area), and the like. Additionally or alternatively, the user may set an image type (or category) to be displayed by division into the main area and the sub-area. The electronic device may determine a display in which the main area and the sub-area are combined based on setting information according to a display setting by the user. The electronic device may determine based on the setting information whether to use image processing (e.g., a main area-based display scheme) for the main area or image processing (e.g., a full resolution-based display scheme of a bent display) for the main area and the sub-area.

In operation 1205, the AP 600 may generate an image having a resolution value corresponding to a transfer scheme, and control information. For example, in a full resolution-based display scheme, the AP 600 may generate an image (e.g., a full resolution image) through image processing corresponding to a full resolution (e.g., 2560*1600) and may generate control information indicating that an image to be transferred is a full resolution image. In a main area-based display scheme, the AP 600 may generate an image (e.g., a light resolution image) through image processing corresponding to a resolution (e.g., 2560*1440) of the main area, and may generate control information indicating that an image to be transferred is a light resolution image. In various embodiments, the control information may include information indicating whether the DDI 700 performs image processing for the sub-area with respect to the image transferred to the DDI 700 by the AP 600. Therefore, the DDI 700 may determine whether or not to perform image processing of at least one sub-area, based on the control information. According to an embodiment, the AP 600 may determine whether to transmit an image in a resolution of 2560*1600 or transmit the image in a resolution of 2560*1440, based on configuration information set by the user.

In operation 1207, the AP 600 may transfer an image and control information to the DDI 700. For example, the AP 600 may transmit a full resolution image (e.g., 2560*1600) and control information thereof or may transmit a light resolution image (e.g., 2560*1440) and control information thereof to the DDI 700.

In operation 1209, the DDI 700 may determine whether to perform image processing on the basis of the control information when the image and the control information are received from the AP 600. For example, when the transferred image is determined to be an image having a resolution of 2560*1600 on the basis of the control information, the DDI 700 may determine to transmit the image transferred from the AP 600 to the display 800 without performing image processing. When the transferred image is determined to be an image having a resolution of 2560*1440, the DDI 700 may determine to perform image processing for the sub-area according to the control information on the basis of the image transferred from the AP 600, and then transmit the processed image to the display 800.

When the DDI 700 determines image processing in operation 1209, the DDI 700 may perform image processing corresponding to the control information based on the image transferred from the AP 600, in operation 1211. For example, the DDI 700 may perform specific processing (e.g., pixel extension, gradation, blur, and the like) according to the control information. According to an embodiment, when the specific processing is pixel extension, the DDI 700 may extend the transferred image having a resolution of 2560*1440 to an image having a resolution of 2560*1600. In various embodiments, the DDI 700 may perform image processing using a scheme in which pixels of the edge part of both side surfaces extend to at least one side surface by the resolution (e.g., 2560*80) of the sub-area. The DDI 700 may provide an effect in which the image having a resolution of 2560*1440 extends to the sub-area so as to be viewed as an image having a resolution of 2560*1520 or 2560*1600.

In operation 1213, depending on whether to perform operation 1211, the DDI 700 may either transfer, as it is, the image (e.g., an image having a resolution of 2560*1600) transferred from the AP 600 to the display 800, or may transfer the image (e.g., an image having a resolution of 2560*1600 or an image having a resolution of 2560*1520), for which image processing for the sub-area (a resolution of 2560*160 or 2560*80) has been performed according to the image processing in operation 1211, to the display 800.

In operation 1215, the display 800 may receive the image from the DDI 700 and may display the received image. For example, the display 800 may display the image (e.g., an image having a resolution of 2560*1600) processed by the AP 600, through the entire area thereof including the main area and the sub-area. Alternatively, the display 800 may display an image (e.g., an image having a resolution of 2560*1440) processed in the AP 600, through the main area, and may display an image (e.g., an image having a resolution of 2560*160 or 2560*80) processed in the DDI 700, through the sub-area. Therefore, it is possible to provide an effect equivalent to a case where an actual image having a resolution of 2560*1600 or 2560*1520 is displayed.

Figure 13:
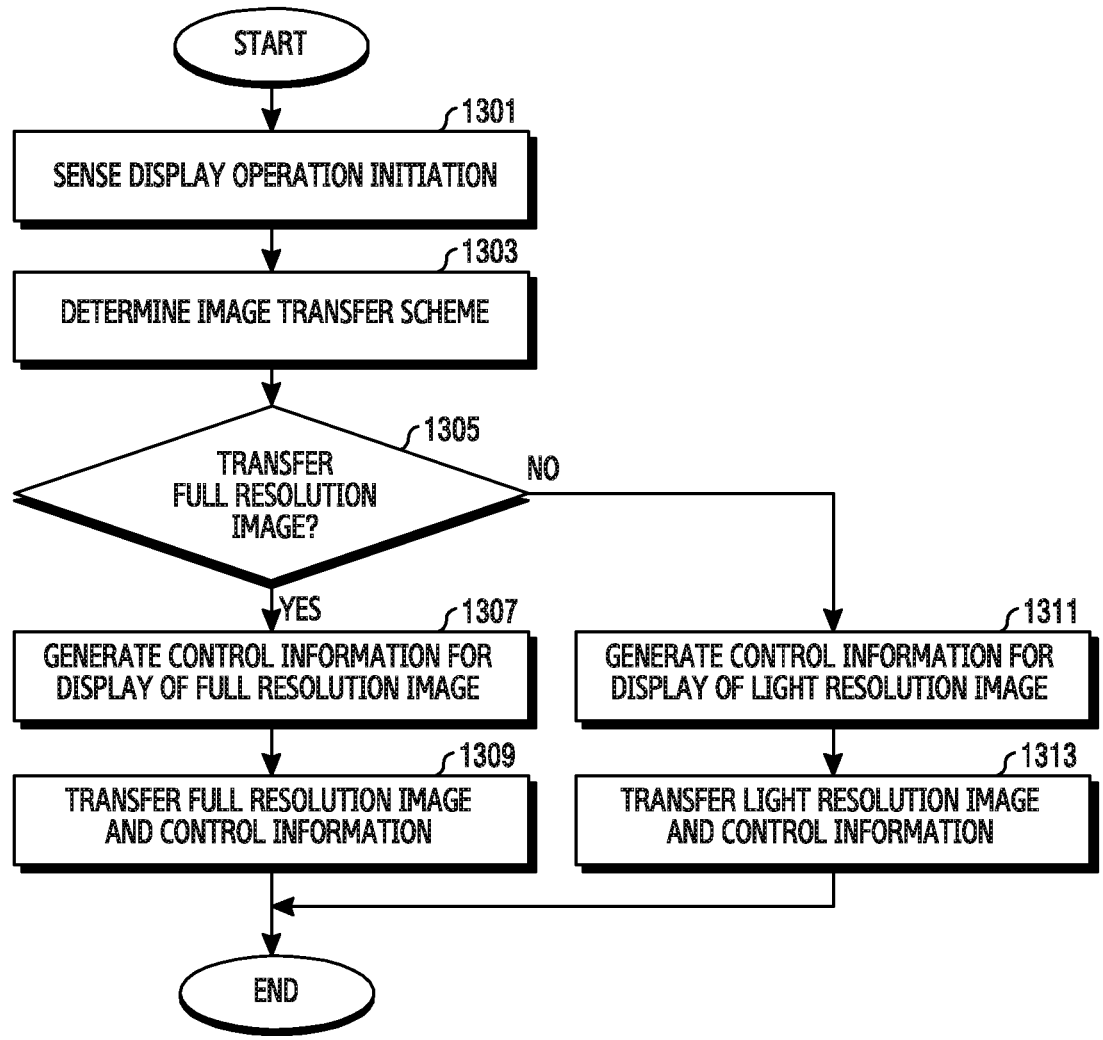
FIG. 13 illustrates a flow chart of a display method in an electronic device according to various embodiments of the present disclosure.

FIG. 13 is a flow chart illustrating a display method in an electronic device according to various embodiments of the present disclosure.

As illustrated in FIG. 13, a display method of a processor (e.g., the AP 600) of the electronic device described in FIG. 12 is provided.

Referring to 13, in operation 1301, the processor (e.g., the AP 600) may sense initiation of an operation of displaying a specific image. For example, the processor may determine initiation of the operation in response to sensing an image display request made by a user, sensing turning-on of the display 800, or the like.

In operation 1303 and operation 1305, the processor may check an image transfer scheme in response to the initiation of the display operation and may determine whether the image transfer scheme is a full resolution image transfer. For example, the processor may determine, by referring to preset configuration information, whether the image transfer is by image processing suitable for a full resolution (e.g., 2560*1600) or the image transfer is by image processing suitable for the main area (e.g., 2560*1440).

When the full resolution (e.g., 2560*1600) image transfer ("Yes" in operation 1305) is determined in operation 1305, the processor may generate control information for display of a full resolution image in operation 1307. According to various embodiments, the processor may generate a full resolution image through image processing for display by a full resolution image, sequentially or in parallel to operation 1307.

In operation 1309, the processor may transfer the full resolution image and control information to the DDI 700.

When the light resolution (e.g., 2560*1440) image transfer ("No" in operation 1305) is determined in operation 1305, the processor may generate control information for display of a light resolution image (e.g., an image for the main area) in operation 1311. According to various embodiments, the processor may generate a light resolution image through image processing for display by a light resolution image, sequentially or in parallel to operation 1311.

In operation 1313, the processor may transfer the light resolution image and the control information to the DDI 700.

Figure 14:
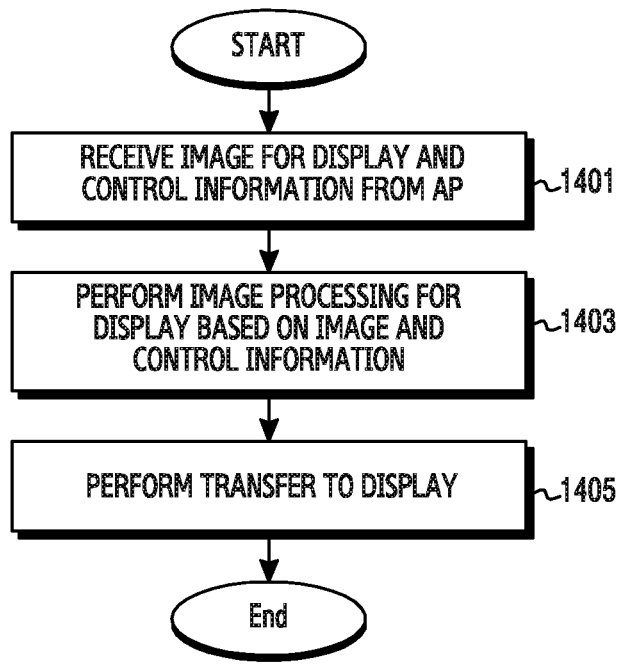
FIG. 14 illustrates a flow chart of a display method in an electronic device according to various embodiments of the present disclosure.

FIG. 14 is a flow chart illustrating a display method in an electronic device according to various embodiments of the present disclosure.

As illustrated in FIG. 14, FIG. 14 provides a display method of a display control circuit (e.g., the DDI 700) of the electronic device described in FIG. 12 is provided.

Referring to FIG. 14, in operation 1401, the display control circuit (e.g., DDI 700) may receive an image for display and control information from the processor (e.g., the AP 600). For example, the display control circuit may receive a full resolution image (hereinafter, referred to as "a full image") and control information thereof, which are transferred by the processor, in accordance with the description (e.g., operation 1309 or operation 1313) provided with reference to FIG. 13, or may receive a light resolution image (hereinafter, referred to as "a light image") and control information thereof.

In operation 1403, the display control circuit may perform image processing for display on the basis of the received image and control information. In various embodiments, the display control circuit may determine whether the transferred image is a full image or a light image, based on the received control information. Based on a result of the determination, the display control circuit may determine in operation 1403 whether to perform image processing. According to an embodiment: when the received image is determined to be a full image, the display control circuit may omit image processing; and when the received image is determined to be a light image, the display control circuit may determine an image processing scheme for display through the sub-area on the basis of the control information, and may perform image processing based on at least a part (e.g., an edge part of the image) of the received image in response to the determined image processing scheme.

In operation 1405, the display control circuit may transfer the image to the display 800. For example, the display control circuit may transfer, as it is, a received full image to the display 800 without separately performing image processing in a case of the full image, and the display control circuit may perform specific image processing of a light image and then transfer the received image (e.g., an image for the main area) and the processed image (e.g., an image for at least one sub-area) to the display 800.

Figure 15:
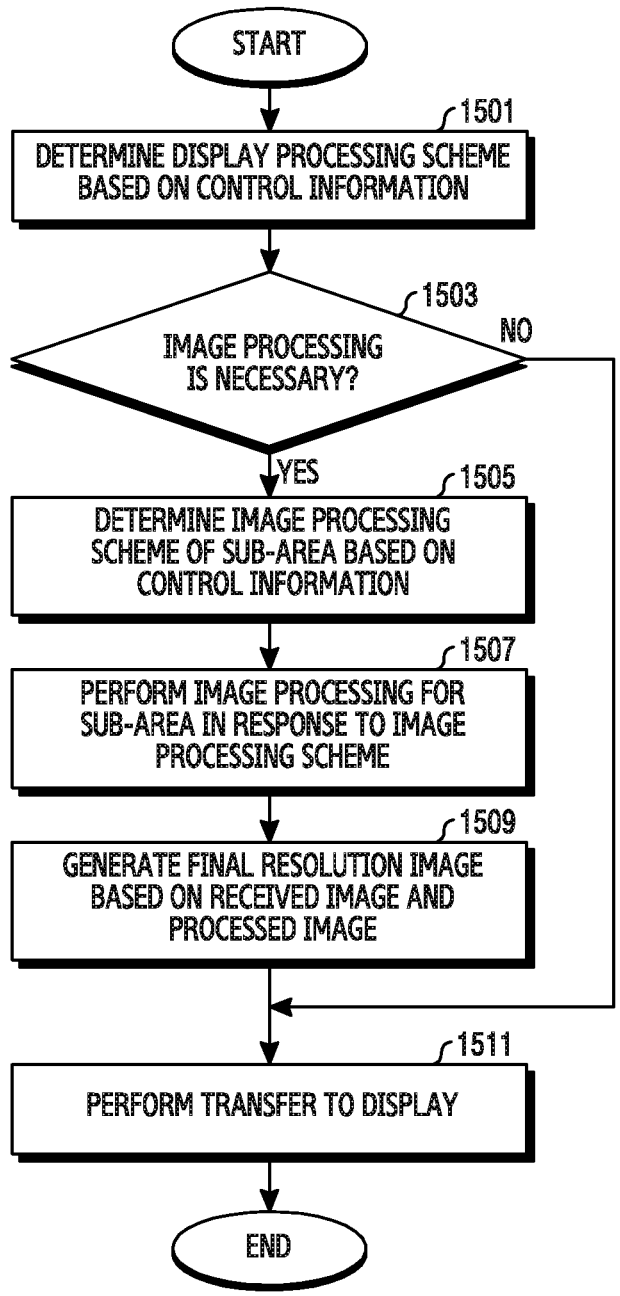
FIG. 15 illustrates a flow chart of a display method in an electronic device according to various embodiments of the present disclosure.

FIG. 15 is a flow chart illustrating a display method in a display control circuit according to FIG. 4.

The display control circuit (e.g., the DDI 700) may check, in operation 1501, a display processing scheme based on control information received from the processor (e.g., the AP 600), and may determine in operation 1503 whether image processing is necessary. For example, the display control circuit may determine whether an image received from the processor is a full resolution image or a light resolution image on the basis of control information. The display control circuit may determine that image processing is necessary when the received image is determined to be a light resolution image.

When image processing is determined to be unnecessary ("No" in operation 1503) in operation 1503, the display control circuit may transfer the received full resolution image, as it is, to the display 800 in operation 1511. For example, when the received image is determined to be a full resolution image, the display control circuit may determine to transfer the full resolution image, as it is, to the display 800 without performing image processing.

When image processing is determined to be necessary ("Yes" in operation 1503) in operation 1503, the display control circuit may determine an image processing scheme of the sub-area based on the control information. For example, when image processing is determined, the display control circuit may determine, based on the control information, the sub-area for processing (e.g., drawing) a virtual image and an image processing scheme for the virtual image.

In operation 1507, the display control circuit may perform image processing for the sub-area in response to the determined image processing scheme. For example, the display control circuit may generate at least one image (e.g., a virtual image) (e.g., at least one image having a resolution of 2560*80) for the sub-area through specific processing (e.g., pixel extension, gradation, blur, and the like) for the sub-area of both side surfaces or the sub-area of one side surface, by using the received light resolution image. In various embodiments, the virtual image may be generated corresponding to the sub-area of both side surfaces. According to an embodiment, the display control circuit may image-process and generate a virtual image (e.g., an image having a resolution of 2560*80 in the left sub-area) for the left sub-area by using a left edge part of the light resolution image. The display control circuit may image-process and generate a virtual image (e.g., an image having a resolution of 2560*60 in the right sub-area) for the right sub-area by using a right edge part of the light resolution image.

In operation 1509, the display control circuit may generate a final image to be transferred to the display 800, based on the received image (e.g., a light resolution image) and the processed image (e.g., a virtual image). For example, the display control circuit may generate an image (an image having a resolution of 2560*1600) corresponding to a full resolution (e.g., 2560*1600) for display on the front surface including the main area and the sub-area of both side surfaces, based on the light resolution image (e.g., 2560*1440) and the virtual image (e.g., at least one image having a resolution of 2560*80). Alternatively, the display control circuit may generate an image (e.g., an image having a resolution of 2560*1520) corresponding to the resolution (e.g., 2560*1520) for display, on a part of the surface including the main area and the sub-area of one side surface.

In operation 1511, the display control circuit may transfer the generated final image to the display 800.

In various embodiments, the display 800 may display an image transferred by the display control circuit.

As described above, according to various embodiments of the present disclosure, a display method of an electronic device may be configured to include: a first processing procedure of processing a light resolution image for a main area of a display in response to a display scheme; a second processing procedure of processing a virtual image for a sub-area of the display based on the light resolution image; and a third processing procedure of processing display by using the light resolution image and the virtual image.

In various embodiments, the first processing procedure may be configured to include: sensing initiation of an operation of displaying an image, by a first processor (e.g., an AP); determining the display scheme by a full resolution image or a light resolution image in response to the initiation of the operation; and generating a full resolution image or a light resolution image in response to the determined display scheme.

In various embodiments, the first processing procedure may be configured to include: generating, by the first processor, an image and control information, which correspond to the determined display scheme; and transferring the generated image and control information to a second processor (e.g., a DDI). In various embodiments, the first processing procedure may be configured to include: when a full resolution image transfer is determined, generating control information for display of a full resolution image, and generating a full resolution image through image processing for display by a full resolution image; and when a light resolution image transfer is determined, generating control information for display of a light resolution image, and generating a light resolution image through image processing for display by a light resolution image.

In various embodiments, the second processing procedure may be configured to include, when an image to be displayed and control information are received from the first processor, determining by the second processor whether the image is a full resolution image or a light resolution image based on the control information. In various embodiments, the second processing procedure may be configured to include: in a case of a full resolution image, transferring the received full resolution image, as it is, to the display without performing image processing; and in a case of a light resolution image, performing specific image processing and then transferring the received image and the processed image to the display.

In various embodiments, the second processing procedure may be configured to include, when the received image is a light resolution image, determining image processing for the sub-area. In various embodiments, the second processing procedure may be configured to include, when the received image is determined to be a light resolution image, determining an image processing scheme for display through the sub-area on the basis of control information, and performing image processing based on at least a part of the received image in response to the determined processing scheme.

In various embodiments, the second processing procedure may be configured to include: determining whether image processing for the sub-area is necessary, based on control information; and when image processing is determined, determining a sub-area for processing a virtual image and an image processing scheme for the virtual image, based on the control information. In various embodiments, the second processing procedure may be configured to include generating at least one virtual image for the sub-area through specific processing for the sub-area of both side surfaces or the sub-area of one side surface by using the light resolution image received from the first processor, and transferring the light resolution image and the virtual image to the display, by the second processor.

The embodiments of the present disclosure disclosed herein and shown in the drawings are merely specific examples presented in order to easily describe technical details of the present disclosure and to help the understanding of the present disclosure, and are not intended to limit the scope of the present disclosure. Therefore, it should be construed that, in addition to the embodiments disclosed herein, all modifications and changes or modified and changed forms derived from the technical idea of the present disclosure fall within the scope of the present disclosure.

We claim:

1. An electronic device comprising:
   a housing;
   a display configured to include a flat first area, which is exposed on one surface of the housing, and a second area, which extends from the first area and at least a part of which is curved;
   a second processor operatively connected with the display;
   a first processor operatively connected with the second processor; and
   at least one memory operatively connected with at least one of the first processor and the second processor,
   wherein the at least one memory is configured to store:
   first instructions that, when executed, cause the first processor to:
      determine whether an image transfer scheme corresponds to a full resolution image transfer or a less than full resolution image transfer,
      generate an image and control information corresponding to the determined image transfer scheme, and
      provide the generated image and control information to the second processor; and
   second instructions that, when executed, cause the second processor to:
      based on the control information received from the first processor, determine whether the image received from the first processor is a full resolution image or a less than full resolution image,
      based on a determination that the received image corresponds to the full resolution image, transfer the received image to the display without performing image processing, and
      based on a determination that the received image corresponds to the less than full resolution image, perform specific image processing on the received image and then transfer the received image and the processed image to the display.

2. The electronic device of claim 1, wherein the first processor comprises an application processor, and the second processor comprises a display driver integrated circuit.

3. The electronic device of claim 1, wherein the at least one memory comprises a first memory configured to store the first instructions, and a second memory configured to store the second instructions.

4. The electronic device of claim 3, wherein the second memory is disposed inside the second processor.

5. The electronic device of claim 3, wherein power consumed by executing the first instructions in the first processor is less than power consumed by executing the second instructions in the second processor.

6. The electronic device of claim 1, wherein the second instructions comprise instructions that, when executed, cause the second processor to control to display a screen in the second area, but not in the first area.

7. The electronic device of claim 1, wherein the first processor is configured to:
   in response to initiation of an operation for display, determine whether the image transfer scheme corresponds to the full resolution image transfer or the less than full resolution image transfer.

8. The electronic device of claim 7, wherein the specific image processing comprises generating at least one virtual image for the second area based on the less than full resolution image received from the first processor.

9. The electronic device of claim 1, wherein the second processor is configured to:
   based on a determination that the received image corresponds to the less than full resolution image, determine an image processing scheme for display through the second area and perform image processing based on at least a part of the received image in accordance with the determined processing scheme.

10. An electronic device comprising:
    a display configured to display an image, the display including a main area on a front surface of the electronic device and a sub-area on a side surface of the electronic device;
    a processor configured to process a full resolution image corresponding to the main area and the sub-area, or process a less than full resolution image corresponding to the main area, and transfer, as processed image, the processed full resolution image or the processed less than full resolution image, and control information corresponding to the processed image, to a display control circuit; and
    the display control circuit is configured to:
       based on the control information received from the processor, determine whether the processed image corresponds to the processed full resolution image or the processed less than full resolution image,
       based on a determination that the processed image corresponds to the processed full resolution image, transfer the processed full resolution image received from the processor to the display without performing further image processing, and based on a determination that the processed image corresponds to the processed less than full resolution image, process a virtual image for the sub-area and transfer the processed less than full resolution image received from the processor and the virtual image to the display.

11. A display method of an electronic device, the method comprising:

determining, by a first processor, whether a display scheme is a full resolution image or a less than full resolution image, generating, by the first processor, an image for displaying on a display including a flat main area and a curved sub-area and control information based on the determined display scheme, providing, by the first processor, the image to a second processor, determining, by the second processor, whether the image received from the first processor is a full resolution image or a less than full resolution image, based on a determination that the received image corresponds to the full resolution image, transferring, by the second processor, the received full resolution image to the display without performing image processing, and based on a determination that the received image corresponds to the less than full resolution image, performing, by the second processor, specific image processing on the received image and then transferring the received image and the processed image to the display.

12. The method of claim 11, wherein the determining the display scheme comprises:

detecting initiation of an operation of displaying an image; and determining, based on the initiation of the operation, the display scheme for the full resolution image or the less than full resolution image.

13. The method of claim 12, wherein the performing specific image processing comprises generating at least one virtual image for one or both of first and second side surfaces of the electronic device based on the less than full resolution image received from the first processor, and transferring the less than full resolution image and the virtual image to the display.

14. The method of claim 13, wherein power consumed by the processing of the less than full resolution image is less than power consumed by the processing of the virtual image.

15. The method of claim 12, wherein the performing specific image processing comprises:

based on a determination that the provided image corresponds to the less than full resolution image, determining an image processing scheme for display through the sub-area based on the control information, and performing image processing based on at least a part of the received image in response to the determined processing scheme.

* * * * *